United States Patent
Damkat et al.

(10) Patent No.: US 10,306,233 B2
(45) Date of Patent: May 28, 2019

(54) APPARATUSES AND METHODS FOR IMPROVED ENCODING OF IMAGES FOR BETTER HANDLING BY DISPLAYS

(75) Inventors: Chris Damkat, Eindhoven (NL); Gerard De Haan, Helmond (NL); Mark Jozef Willem Mertens, Eindhoven (NL); Remco Muijs, Meteren (NL); Martin Hammer, Arendonk (BE); Philip Steven Newton, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 532 days.

(21) Appl. No.: 13/821,403

(22) PCT Filed: Sep. 9, 2011

(86) PCT No.: PCT/IB2011/053950
§ 371 (c)(1),
(2), (4) Date: Mar. 7, 2013

(87) PCT Pub. No.: WO2012/035476
PCT Pub. Date: Mar. 22, 2012

(65) Prior Publication Data
US 2013/0170540 A1 Jul. 4, 2013

(30) Foreign Application Priority Data
Sep. 16, 2010 (EP) .................. 10177155

(51) Int. Cl.
*H04N 19/00* (2014.01)
*H04N 19/136* (2014.01)
(Continued)

(52) U.S. Cl.
CPC ......... *H04N 19/136* (2014.11); *G09G 3/3426* (2013.01); *H04N 19/154* (2014.11);
(Continued)

(58) Field of Classification Search
CPC ........... G09G 3/3426; G09G 2320/062; G09G 2360/16; G09G 2370/04; H04N 19/85;
(Continued)

(56) References Cited

U.S. PATENT DOCUMENTS 5,790,096 A * 8/1998 Hill, Jr. .................... 348/441
7,284,874 B2 10/2007 Jeong et al.
(Continued)

FOREIGN PATENT DOCUMENTS

EP 1827024 A1 8/2007
EP 2009921 A2 12/2008
(Continued)

OTHER PUBLICATIONS

Anonymous: "Remote Backlight Dimming"; Technical Disclosure, IP.com Prior Art Database, Jan. 22, 2008, 3 Page Document.
(Continued)

*Primary Examiner* — Francis Geroleo

(57) ABSTRACT

To allow better quality rendering of video on any display, a method is proposed of encoding, in addition to video data (VID), additional data (DD), wherein the additional data includes at least one change time instant (TMA_1) indicating a change in time of a characteristic luminance (CHRLUM) of the video data, which characteristic luminance summarizes a set of luminances of pixels in an image of the video data, the method:
generates on the basis of the video data (VID) descriptive data (DED) regarding the characteristic luminance variation of the video, the descriptive data comprising at least one change time instant (TMA_1), and
encodes and outputs the descriptive data (DED) as additional data (DD).

29 Claims, 8 Drawing Sheets

(51) Int. Cl.
  *G09G 3/34* (2006.01)
  *H04N 19/46* (2014.01)
  *H04N 19/154* (2014.01)
  *H04N 19/85* (2014.01)
(52) U.S. Cl.
  CPC ............ *H04N 19/46* (2014.11); *H04N 19/85* (2014.11); *G09G 2320/062* (2013.01); *G09G 2360/16* (2013.01); *G09G 2370/04* (2013.01)
(58) Field of Classification Search
  CPC .... H04N 19/46; H04N 19/136; H04N 19/154; H04N 19/00545
  USPC ..................................................... 375/240.01
  See application file for complete search history.

(56) References Cited

U.S. PATENT DOCUMENTS

| | | | | |
|---|---|---|---|---|
| 7,477,228 | B2* | 1/2009 | Wyatt | 345/102 |
| 7,580,024 | B2* | 8/2009 | Kamimura | 345/102 |
| 8,654,060 | B2* | 2/2014 | Chen et al. | 345/102 |
| 2002/0154088 | A1* | 10/2002 | Nishimura | 345/102 |
| 2005/0035974 | A1* | 2/2005 | Nair | G09G 5/06 345/589 |
| 2005/0104838 | A1* | 5/2005 | Sasaki | 345/102 |
| 2005/0134547 | A1* | 6/2005 | Wyatt | 345/102 |
| 2006/0001641 | A1* | 1/2006 | Degwekar et al. | 345/102 |
| 2009/0096710 | A1 | 4/2009 | Raman et al. | |
| 2010/0253846 | A1* | 10/2010 | Fergason et al. | 348/576 |
| 2011/0298839 | A1* | 12/2011 | Nakanishi | G09G 3/3426 345/690 |

FOREIGN PATENT DOCUMENTS

| | | | | |
|---|---|---|---|---|
| JP | 2002077780 | A | 3/2002 | |
| JP | 2007124368 | A | 5/2007 | |
| JP | WO 2010084710 | A1 * | 7/2010 | ........... G09G 3/3426 |
| WO | 2006129263 | A2 | 12/2006 | |
| WO | 2008095037 | A2 | 8/2008 | |
| WO | 2010039419 | A1 | 4/2010 | |

OTHER PUBLICATIONS

Iranli et al: "Backlight Dimming in Power-Aware Mobile Displays"; DAC 2006, Jul. 2006, ACM/IEEE, pp. 604-607.
Kim et al: "Backlight Power Reduction Using Eficient Image Compensation for Mobile Devices"; IEEE Transactions on Consumer Electronics, vol. 56, No. 3, Aug. 2010, pp. 1972-1978.
Seetzen et al: "High Dynamic Range Display Systems"; ACM 2004, pp. 760-768.
Seetzen et al: "Observations of Luminance, Contrast and Amplitude Resolution of Displays"; SID 06 Digest, pp. 1229-1233.
Tsai et al: "Image Enhancement for Backlight-Scaled TFT-LCD Displays"; IEEE Transactions on Circuits and Systems for Video Technology, vol. 19, No. 4, Apr. 2009, pp. 574-583.
Yoshida et al: "Analysis of Reproducing Real-World Appearance on Displays of Varying Dyanamic Range"; Eurographics 2006, vol. 25 (2006) No. 3, 12 Page Document.
Fisekovic, "Improved Motion-Picture Quality of AM-LCDS Using Scanning Backlight", IDW Proceedings (International Display Workshops), 2001, pp. 1637-1640.
Seetzen et al, "A High Dynamic Range Display Using Low and High Resolution Modulators", Proc. of the 2003 SID Symposium, May 2003, pp. 1450-1453.
Ferwerda et al, "A Model of Visual Adaptation for Realistsic Image Synthesis", Proc. of SIGGRAPH, 1996, pp. 249-258.
Barten, "Physical Model for the Contrast Sensitivity of the Human Eye", Proc. SPIE, vol. 1666, 1992, pp. 57-72.
Barten, "Spatio-Temporal Model for the Contrast Sensitivity of the Human Eye and Its Temporal Aspects", Proc. SPIE, vol. 1913, 1993, pp. 1-13.

Muka et al, Reconsidering Bit Depth for Radiological Images—Is Eight Enough?, Proc. SPIE, vol. 4686, 2002, pp. 177-188.
Chiu et al, "Spatially Nonuniform Scaling Functions for High Contrsat Images", Proc. Graphics Interface, 1993, pp. 245-253.
Choudhury et al, "The Trilateral Filter for High Contrsat Images and Meshes", Eurographics Symposium on Rendering, 2003, pp. 186-196.
Durand et al, "Fast Bilateral Filtering for the Display of High-Dynamic-Range Images", ACM Trans. Graph. vol. 21, Issue 3, 2002, pp. 257-266.
Gardner et al, "Linear Light Source Reflectometry", ACM Trans. Graph., SIGGRAPH, vol. 22, Issue 3, 2003, pp. 749-758.
Kang et al, "High Dynamic Range Video", ACM Trans. Graph., SIGGRAPH, vol. 22, Issue 3, 2003, pp. 319-325.
Larson et al, "A Visibility Matching Tone Reproduction Operator for High Dynamic Range Scenes", IEEE Trans. on Visualization and Computer Graphics, vol. 3, No. 4, 1997, pp. 1-35.
Mann et al, "On Being 'Undigital' With Digital Cameras: Extending Dynamic Range by Combining Differently Exposed Pictures", MIT Media Lab Perceptual Computing Section, Tech. Rep. 323, 1994, pp. 1-7.
Mark et al, "Cg: A System for Programming Graphics Hardware in a C-Like Language", ACM Trans. Graph, SIGGRAPH vol. 22, Issue 3, 2003, pp. 896-907.
Mitsunaga et al, "Radiometric Self Calibration", IEEE CVPR, 1999, pp. 472-279.
Moon et al, "The Visual Effects of Non-Uniform Surrounds", Journal of the Optical Society of America, vol. 35, No. 3, Mar. 1945, pp. 233-248.
Ohtsuki et al, "18.1-Inch XGA TFT-LCD With Wide Color Reproduction Using High Power LED-Backlighting", SID Digest, 2002, pp. 1154-1157.
Pattanaik et al, "A Multiscale Model of Adaptation and Spatial Vision for Realistic Image Display", ACM SIGGRAPH, 1998, pp. 287-298.
Reinhard et al, "Photographic Tone Reproduction for Digital Images", ACM Trans. Graph., SIGGRAPH, vol. 21, Issue 3, 2002, pp. 267-276.
Robertson et al, "Dynamic Range Improvement Through Multiple Exposures", Proc. of International Conference on Image Processing, 1999, pp. 159-163.
Schlick, "Quantization Techniques for Visualization of High Dynamic Range Pictures", Proc. of Eurographics Workshop on Rendering, 1994, pp. 7-20.
Tumblin et al, "Tone Reproduction for Realistic Images", IEEE Computer Graphics and Applications, vol. 13, No. 6, 1993, pp. 42-48.
Tumblin et al, "LCIS: A Boundary Hierarchy for Detail-Preserving Contrast Reduction", Proc. of ACM SIGGRAPH, 1999, pp. 83-90.
Debevec et al, "Recovering High Dynamic Range Radiance Maps From Photographs", ACM SIGGRAPH, 1997, pp. 369-378.
Ashikhmin, "A Tone Mapping Algorithm for High Contrast Images", Eurographics Workshop on Rendering, 2002, pp. 1-11.
Fattal et al, "Gradient Domain High Dynamic Range Compression", ACM Trans. Graph, SIGGRAPH, vol. 21, No. 3, 2002, pp. 249-256.
Part 14: Grayscale Standard Display Function, Digital Imaging an Communications in Medicine (DICOM), 2001, 56 Page Documents.
Vos, "Disability Glare—A State of the Art Report", CIE Journal, vol. 3, No. 2, 1984, pp. 39-53.
Seetzen et al, "Observations of Luminance, Contrast and Amplitude Resolution of Displays", Proc. of the 2006 SID Symposium, May 2006, pp. 1229-1233.
Yoshida et al,"Analysis of Reproducing Real-World Appearance on Displays of Varying Dynamic Range", Eurographics, vol. 25, No. 3, 2006, pp. 1-12.
Drago et al, "Adaptive Logarithmic Mapping for Displaying High Contrast Scenes", Eurographics, vol. 22, No. 3, 2003, pp. 419-426.
Drago et al, "Perceptual Evaluation of Tone Mapping Operators With Regard to Similarity and Preference", Technical Report MPI-I-2002-4-002, 2002, pp. 1035.

(56) References Cited

OTHER PUBLICATIONS

Delahunt et al, "Perceptual Image Quality: Effects of Tone Characteristics", Journal of Electronic Imaging, vol. 14, No. 2, 2005, pp. 1-12.
Fedorovskaya et al, "Chroma Variations and Perceived Quality of Color Images of Natural Scenes", Color Research and Applications, vol. 22, No. 2, 1997, pp. 96-110.
Gilchrist et al, "An Anchoring Theory of Lightness Perception", Psychological Review, vol. 106, No. 4, 1999, pp. 795-834.
Johnson, "Cares and Concerns of CIE TC8-08: Spatial Appearance Modeling and HDR Rendering", Image Quality and System Performance II, SPIE, vol. 5668, 2005, pp. 148-156.
Jobson et al, "The Statistics of Visual Representation", Visual Information Processing XI, SPIE, vol. 4736, 2002, pp. 25-35.
Kuang et al, "Testing HDR Image Rendering Algorithms", IS&T/SID Color Imaging Conference, 2004, pp. 315-320.
Ledda et al, "Evaluation of Tone Mapping Operators Using a High Dynamic Range Display", ACM Transactions on Graphics, vol. 24, No. 3, 2005, pp. 640-648.
Reinhard, "Dynamic Range Reduction Inspired by Photoreceptor Physiology", IEEE Transactions on Visualization and Computer Graphics, 2005, pp. 13-24.
Savakis et al, "Evaluation of Image Appeal in Consumer Photography", Human Vision and Electronic Imaging V, SPIE, vol. 3959, 2000, pp. 111-120.
Tumblin, "Three Methods of Detail-Preserving Contrast Reduction for Displayed Images", PHD Thesis, Georgia Institute of Technology, 1999, pp. 1-131.
Yoshida et al, "Perceptual Evaluation of Tone Mapping Operators With Real-World Scenes", Human Vision and Electronic Imaging X, SPIE, vol. 5666, 2005, pp. 192-203.

\* cited by examiner

APPARATUSES AND METHODS FOR IMPROVED ENCODING OF IMAGES FOR BETTER HANDLING BY DISPLAYS

FIELD OF THE INVENTION

The invention relates to apparatuses and methods and resulting products like data storage products for improved encoding of images, in particular, allowing better handling of the encoded images by displays.

BACKGROUND OF THE INVENTION

Recently new developments have occurred regarding the encoding of images/video (whether of captured scenes or computer graphics), namely, it is desirable to better capture the entire range of luminances and colors occurring in nature, which is called HDR (high dynamic range) encoding. As both cameras and displays are getting increasingly larger native ranges, a better standard is required for transmitting the image information between them. On the other hand, still a large number of lower-range devices exist (e.g. old displays, printers, etc.), and these are also present in some imaging system chains. Typically a low dynamic range (LDR) device like a low quality camera encodes in 8 bit data words (pixels) a middle range of interesting values (e.g. well-lit face colors), at the cost of colors outside this range [note that where understanding is not sacrificed, we may use the term color even if in a color coding triplet its luminance is the most important factor for the present discussion].

If a human looks at an image, there are a number of factors influencing the quality. Firstly there is the brightness of the whitest white which can be reproduced. Secondly, there is the darkest black which still can be reproduced, and perhaps reproduced reasonably, e.g. with little noise or other interference. White and black determine the dynamic range of the device. But for a real image, those are not the only parameters influencing the look. There are also parameters determining where the intermediate greys should ideally be. A first one is contrast, which is a measure related to the lightness of different objects in the image. If there are at least some objects of the different possible greys between good white and black, the image is said to globally have good contrast. But also local contrast can be important, e.g. between one object and its surroundings. Even very local luminance changes like sharpness influences perceived contrast. It is by looking at e.g. a real scene that viewers see it has really impressive contrast (e.g. as contrasted to an adjacent 6 bit projected image). But secondly, also the location of objects/regions on the black-to-white axis will have impact, particularly on naturalness (or artistic look). E.g. (well lit) faces are supposed to have a certain percentage of light reflection compared to white. A face which is too white may seem strangely glowing, or the viewer may misinterpret the image in that he thinks the face is illuminated by some additional light. Thirdly, the precision of the allocated colors may be important, not so much in complex textures, but e.g. in facial gradients. Many viewers seem to prefer the brightness-related quality improvements (inclusive the related color saturation) over the other aspects, and this application will mostly focus on luminance-related issues.

The purpose of a display is to display a quality rendering to a viewer. Ideally, this would be an accurate (photorealistic) representation, but since this is still far in the future, other quality criteria can be used like e.g. recognizability of the image, approximate naturalness (e.g. absence of artefacts), or visual effect/impact, etc.

A popular HDR display emerging currently is an LCD with LED backlights in a 2-dimensional pattern, allowing 2-dimensional dimming. The dynamic range of such displays is influenced by several factors.

Firstly, LCDs are getting increasingly brighter due to improved backlighting. Where a couple of years ago 200 nit white was typical, now 500 nit is typical, the coming years 1000 nit will be typical, and a later even 2000 nits or above. However, this poses severe technical constraints on the television or monitor, such as cost and power usage.

Secondly, regarding the blacks, LCDs have a problem with light leakage (especially under certain conditions like large angle viewing), which means that an LCD may have an intrinsic contrast (LCD cell open/closed) of 100:1, although research is making LCDs better. A solution to this is to change the amount of light from behind coming through the LCD valve. 2D dimming displays can in this way theoretically achieve very high contrast, since if the light behind the LCD cell has zero luminance, apart from leakage a zero luminance will locally come out of that region of the display. Dynamic ranges above 10000:1 or even 100000:1 have been reported. However, in practice, a major factor limiting the display black rendering is the light from the surroundings reflected on the front glass of the display. This may reduce the dynamic range to a more realistic 100:1 or even less than 20:1 for bright surrounds. However, also in a dark viewing environment light may leak due to all kinds of reasons, e.g. interreflections on the front glass from a brighter region to a darker region.

Lastly, of course the human eye is also of importance, and mainly its adaptation state, but also the complex image analysis happening in the brain. The eye adapts on a combination of room illumination on the one hand and display brightness on the other (actually, the images shown). These two factors may be relatively in tune for e.g. 500 nit televisions under normal living room viewing, but may also be far apart in other rendering scenarios. Not only the detail seen in black will be influenced, but also the appearance of the bright regions. E.g., viewing comfort will be influenced by the particular display settings, i.e. tiring of the eyes, or even psychological effects like not liking the image rendering. The retina is very complex, but can simply be summarized as follows. Its cones have a biochemical process which always tries to make the sensitivity of the eye (by means of amounts of light sensitive molecules) optimal for any given scene. This works because whatever the illumination (which may change between full moonlight 0.1 lx, to overcast sky or not too well lit rooms 100 lx, to direct bright sunlight 100000 lx, i.e. range over more than a million difference factor), object reflections typically range over 1-100%, and it is that dark panther in the dark bush that human vision optimally needs to discern locally. The eye needs to cope with a larger scene dynamic range—taking illumination effects like shadows or artificial illumination into account— which can typically be 10000:1. Further retinal cells like the ganglion cells make smarter use of the combination of all these primary signal, and so doing e.g. change the level of a local response dependent on the luminances of its surroundings etc.

Lastly, a very important factor in converting by analysis of this preprocessed raw image field is the visual cortex. It will e.g. redetermine the color of a yellow patch once it realizes that this patch is not a separate object but rather part of another yellow object, or recolor the grass seen behind a glass window once it understands the colored reflection overlapping that local region. It generates what we may call the final color "appearance" and it is theoretically this factor which both display manufacturers and content creators are in the end interested in. So any technology which conforms more to what human vision needs is desirable (in particular when taking into account other technical constraints).

Although there is no generally recognized standard for encoding HDR images yet (especially for video), first attempts to encode images (typically captured by stretching the limits of camera systems by e.g. using multiple exposures and hoping the lens doesn't thwart the effort too much) did this by allocating large bit words (e.g. 16 bit, allowing 65000:1 linear coding, and more for non-linear coding) to each pixel (e.g. the exr format). Then, the mapping of a variable amount of light reflecting (to which the eye partially but largely adapts) on scene objects to an image rendering system comprising an LCD valve module and a backlight can be done by e.g. illumination estimation techniques like in EP1891621B [Hekstra, stacked display device]. A simplistic algorithm to realize the output_luminance= backlighting_luminance×LCD_transmission is to take the square root of the HDR 16 bit input, so allocating a multiplicative 8 bit background image which may be subsampled for the LEDs (conforming to ratio coding techniques). There are also other methods to plainly encode the appearing scene luminance values merely as they are in classical ways, e.g. EP2009921 [Liu Shan, Mitsubishi Electric] which uses a two layer approach for encoding the pixel values.

However, the inventors have realized that, if one goes for a new encoding, in addition to such mere encoding of the scene image pixels (and using this as main, sole encoding for the entire chain), some further encoding is desirable, as it will greatly improve the understanding and hence usability of the imaged actions.

SUMMARY OF THE INVENTION

Ideally a video encoding chain is a simple chain, and there are only minor errors compared to the ideal representation, which can hence be discarded. This was how television signal encoding was done in the past (e.g. NTSC, and the standards based upon those principles, like MPEG2). A standard/reference display is defined (with EBU phosphor, a gamma of 2.2, certain viewing conditions), and this at least allows some fixedly defined encoding of the scene colors of the scene to be captured. The camera will then be designed on the basis of this display (display-related encoded signals result, e.g. YCrCb). The skills of the camera operator, post production etc. tune the data to be more close to that final display color space (typically by viewing the final result on a reference monitor). However, this was a situation which was fine in the beginning of image reproduction, when there was only one kind of display, and we were already happy with having any working system. Nowadays however, television displays range over such variable technologies as mobile phones under sunlighting conditions or home cinema projection, and also, television producers provide ever more image processing functionality in their displays. An interesting question can hence be raised who would be controlling the most of the final color appearances: the content creator (Hollywood may want to have at least some say in at least the limits of how a television can change the colors/brightnesses in their movies), the display manufacturer (typically via automatic image enhancement, or other display-related processing), or the end user (via the controls offered by the display). When formulating a new television standard, one may involve such considerations to define what can be (at least optionally) prescribed in such a standard.

E.g., whereas in the coming years there will not be a perfect match between what the content creator would like to show, and what any particular actual display (and display environment) can show (e.g. the content creator may want to come close to a darkish scene, but at the rendering side it may be brightened), one can offer better options to control the behavior of those (e.g., allow the display to make smarter image enhancement, or in general technical settings for its operation, such as driving values for the various display components).

This can be useful for the viewer (e.g. to provide a certain amount of image (color/luminance) rendering or effect, given the display hardware but also preferences of the user, e.g. based on his age, character, mood, etc.), but at the very least additional information in the video encoding (beyond mere pixel colors) can also be used for handling physical display constraints such as power consumption, thermal problems, aging, etc. Interestingly enough, some additional data encodings are advantageously so generic, that they may provide increased value in the entire chain. A content creator (or post-creator, which might comprise an additional human-based service, or even an automatic video analysis, e.g. for a transcoding) may e.g. use the additionally encoded data to create a better description of his movie, and the actual intentions he had with it, allowing better rendering on the display side. A display manufacturer can better control the run-time behavior of his display (given very variable image input). A final user/viewer can if he so desires better tune the video to his own preferences, and see it as he likes it most (e.g. in case he finds some programming to be flickering too annoyingly, he may tune those program snippets down).

Several such problems and considerations of the need for better video encoding were taken as input when contemplating the various embodiments according to the present invention.

To tackle at least some of those concerns, we propose a method of encoding, in addition to video data (VID), additional data (DD) comprising at least one change time instant (TMA_1) indicating a change in time of a characteristic luminance (CHRLUM) of the video data, which characteristic luminance summarizes a set of luminances of pixels in an image of the video data, the method comprising:

generating on the basis of the video data (VID) descriptive data (DED) of the characteristic luminance variation of the video, the descriptive data comprising at least one change time instant (TMA_1), and encoding and outputting the descriptive data (DED) as additional data (DD).

These change time instants then give very important additional information on the video, and can be used to more smartly process and/or render the video in a receiving device such as a television, and in particular better tuned to each particular television, current viewer preference (potentially dependent on each subsegment of a particular video), etc. Conventionally the philosophy of video encoding has always been that this set of images can satisfactorily be encoded by encoding the separate images with pixel images encoding techniques. However, when looking at a coarser scale there is important information in the coarser scale temporal structure of the video too. In principle, one might expect that this information can be derived when having available those pictures. However, there may be factors in that information which may not be easily derivable, e.g. by an automatic video analysis apparatus at a receiving end.

E.g., the analysis component may not have sufficient resources, such as: it may not have complex enough analysis algorithms, or no access to enough images from a future compared to a particular time instant, such as a time instant for display. Also, a content creator may want to convey something special about some temporal evolution of the image signal, in particular its pixel luminances. E.g., the creator may have created a succession of encoded images containing an explosion, which may have pixel values dependent on physical limitations of the encoding system (e.g., he may have needed to compromise to allocate the explosion to the best available 8 bit LDR values). In addition to that he may want to convey some additional information, e.g. that this is supposed to be a "very powerful explosion", whereas a second explosion later in time, although its pixel values may due to the encoding limitations not be so much different (so very difficult for the analysis device to automatically judge that difference), is supposed to be a "less powerful explosion". At the content creation side there is still typically a human artist present, so in addition to determining the optimal encoding of the pixel images, he may co-encode additional data (e.g. change the image pixel values somewhat, but describe that with complementary data in the additional data).

The interesting additional data modeling better the temporal nature of the video according to present embodiments, can be derived based upon a concept of characteristic luminance (CHRLUM). This summarizes the luminances globally present in at least one image, and oftentimes in successive images (so potentially also averaged over some images). E.g., a camera movement from inside a shadow region to an essentially sunny view will show itself in the average luminance (of all pixels) of the shadowy image being different from the average luminance of the sunny view image. In particular, characteristic luminance is seriously affected if the variation is so large it changes a considerable amount of the LDR video range, or if the characteristic luminance is so formulated it characterizes typically HDR range levels or variations, i.e. e.g. an explosion contains several pixels with very high luminances compared to an average or expected or desired luminance level (or vice versa with dark environments). One can generalize that coarse level concept of characteristic luminance by only considering some coarse level local luminance changes (although looking e.g. only at a region containing a bright light in an image makes the characteristic luminance more local than averaging over an entire picture, if the characterizing is done over the main luminance region(s)/action(s) of the current shot, it is still essentially a coarse level characterization). E.g., if a successive set of images contains a localized explosion flame, one may derive the characteristic luminance by only averaging over the flame pixels (not needing the surrounding building pixels e.g.). This may be done by averaging over the first image having the flame, or by taking a characteristic integral of flame pixels in several selected images containing the flame, however, one may allocate the moment of change at the first time instant when the flame appears. The descriptive data (DED) resulting from analyzing the image(s) may be according to the present invention embodiments variously embodied as the skilled person understands (e.g. one may as a starting point, or final co-information encode a ellipsoidal brightness model of the explosion flame ball), however, it will always contain at least a change time instant (TMA_1) whereat it is considered by the analysis unit and/or human operator that the change in that coarse characteristic luminance change occurs during the video (this may be the exact first image with the explosion, or approximately, somewhere say in the beginning of the explosion shot). The descriptive data is finally encoded in addition to typically a classical encoding of video data (which may be of lesser information content if some of the HDR is encoded in the additional data) as additional data DD, which may just be a copy of the descriptive data DED, or comprise a subset and/or transformation of that data, but it is what is required at a further station of an imaging chain according to predescribed requirements.

Further interesting modifications embodiments of our methods, apparatuses, signals, uses of the arrangements or signals, etc., can non limitatively be e.g.:

A method of encoding additional data (DD) as more generically described above, wherein the method comprises a step of encoding in the additional data (DD) at least one indication (ALCORR, (TYPE)) of allowed reprocessing strategies of at least the luminances of the pixels of the video data by an apparatus (112, 110) using the video data and additional data, such as a television display.

This now allows the rendering processor or display to do several specific image processings around the change time instants, instead of what it would normally do blindly. This can be either loosely ("display_do_what_you_want") or a more or less precise strategy of what a display should do, but preferably everything is tunable to take into account the display and environment specifics, yet also allow for some control by the creation side, i.e. making the display at least to a certain extent follow an encoded suggestion (whether and which processing should, could, could not, etc. happen). An LCD display with backlight may e.g. consider to (slightly) modify the backlight driving compared to what would be considered exact rendering (i.e. an output pixel luminance being produced with an optimal LCD transmission percentage, and therefrom the backlight luminance, to obtain exactly the desired pixel values as described in e.g. a 16 bit HDR image representation). This may lead to a somewhat differently rendered image (different output colors/luminances), yet this may be desirable. Also, displays which have a single per pixel display element, such as e.g. OLEDs, may use the same algorithmic theory by using a "pseudo-backlighting", i.e. allowing modulation of their total driving signal, by defining some basic component, and a typically multiplicative variation thereupon.

Reprocessing will typically involve a functional transformation, e.g. mapping previous pixel colors/luminances for at least some regions of a set of successive images to new pixel colors/luminances. The change in characteristic luminance can in various reprocessing embodiments (e.g. for downtuning flicker) also be reformulated as a change in transformation strategies or parameters, in particular, comprising a moment of desired change of transformation (note that in principle the change time instant TMA_1 of when the change in characteristic luminance was considered to occur may be different from a time instant TP_1 at when a desired reprocessing starts [e.g. dimming a backlight segment], but oftentimes they may be considered the same, e.g. if necessary by defining the reprocessing function or algorithm to have no impact for the first few images, e.g. for a multiplicative function giving it leading 1's). Indications of processing strategies can be various, from very high level, to very strict. E.g. it may be indicated that any processing at all is allowed, e.g. for the present shot, or not (if it should be critically rendered because it was critically graded). Or it may be indicated whether a kind of processing is allowed (e.g. mere lightness reduction), or whether only processing of the type to optimally try to render the look (e.g. a dark scene) given display side considerations is allowed versus whether also e.g. display specific processing like power saving is allowed which may reduce the image rendering quality. Or, even a specific function to apply around the change time instant may be prescribed. Note that the reprocessing need not be a fixed one, but may be tunable e.g. dependent on viewer desire presets, but it may still be constructed on the basis of the at least one change time instant (e.g. with parametric reprocessing functions).

Further useful is a method of encoding additional data (DD), comprising a step of encoding a particular reprocessing code (MULT) from a set of prefixed agreed codes.

Further useful is a method of encoding additional data (DD), comprising a step of encoding in the additional data (DD) a deviation strategy, such as e.g. an encoded temporal profile (PROF) or a mathematical algorithm for calculating a deviation strategy, for reprocessing during a time interval DTI the pixel luminances of the video data (VID), as compared to initial luminances (Lin*), which reprocessing may be based on a psychovisual model, or on a physical characteristics of the display and/or viewing environment, etc.

I.e. in this case the indication has become more of a specific prescription. One may e.g. start from initial luminances Lin* as they were coded in the video signal VID, and apply a multiplicative profile to them, which gently/imperceptibly lowers the luminances over time for this shot. The profile may be additive, multiplicative, just an indication e.g. a coarse level average of what the final (output) luminance profile over time should look like (and the television can process however to approximately obtain it), etc.

Further useful is a method of encoding additional data (DD) wherein the reprocessing is of a type comprising determining an illumination image for a backlight (ILIM), and the encoding step comprises encoding data for influencing the determination of the illumination image for a backlight (ILIM) during an interval around the change time instant (TMA_1), such as a temporal function comprised of elementary basis function contributions for at least a spatial region of positions of a two dimensional matrix (MAP). One can then suggest or control specific renderings by more directly playing on the backlight part, in a spatio-temporal way. E.g., one may in a simple way characterize (part of) some HDR effect such as an explosion by composing it from a set of functions such as some local oscillations, diminishing power functions, Gaussian decompositions, etc., which are defined at least in part based on the time instant (e.g. a sampling window over the function, the location of the mode of a Gaussian is determined compared to TMA_1, or the starting point of a decreasing function, etc.)

Further useful is a method of encoding additional data (DD) comprising a step on encoding in the additional data (DD) information of characteristic luminances of a future of the change time instant (TMA_1) and/or information of expected luminances of an illumination image for a backlight (ILIM) of a reference display.

Having as precise as feasible a knowledge of the future of the video, especially a summarization of the upcoming image pixel luminances can make the display or rendering processor, or any device using the encoded additional data make smart decisions regarding its current processing, e.g. maximizing the visual impact, power-sensible driving the backlight in view of future power usage, etc. For some applications such as power management, this characterization of the future characteristic luminances may be very coarse level since one only needs to approximately know how much light is going to be needed (i.e. e.g. an average of the characteristic luminance over the next 10 seconds and additionally/or alternatively two minutes may be encoded; a temporal hierarchy of such characterizations does allow the receiving side to make smarter predictions, e.g. about power to spend currently), however for precise psychovisual impact realization, more detailed knowledge of the temporal modulations may be required. Whether for a backlighted display or a non-backlighted display, one may equivalently encode the characteristic variations on a total picture encoding (such as VID), or on a (virtual) component thereof such as a backlight contribution, and the receiving side may thereof obtain any required variant, e.g. by using a prefixed or co-encoded multicomponent splitting algorithm.

Further useful is a method of encoding additional data (DD) comprising a step of encoding in the additional data (DD) an importance indication (IMPLEV) for at least one change time instant (TMA_1). This allows very versatile deviation reprocessing, such as e.g. a hierarchical treatment (e.g. diminishing) of the rendering in several related time intervals (e.g. several related high brightness effects). In case the display side has difficulties in rendering all the effects, it may based on the importance render only the more important ones, or it may design a reprocessing taking into account the hierarchy of importances etc.

Further useful is a video encoding apparatus (524) arranged to encode, in addition to video data (VID), additional data (DD) comprising at least one change time instant (TMA_1) indicating a change in time of a characteristic luminance (CHRLUM) of the video data, which characteristic luminance summarizes a set of luminances of pixels in an image of the video data, on the basis of descriptive data (DED) regarding the characteristic luminance variation of the video.

Further useful are video encoding apparatuses (524) arranged to encode, in addition to video data (VID), additional data (DD) according to any of the above described or below described principles, in particular having specifically embodied encoders, formatters, etc. for different specifications of what the receiving side may perform as image reprocessing at particular times.

Further useful is a method of decoding additional data (DD) video data (VID), the additional data (DD) comprising at least one change time instant (TMA_1) indicating a change in time of a characteristic luminance (CHRLUM) of the video data, which characteristic luminance summarizes a set of luminances of pixels in an image of the video data, the method further comprising outputting at least one change time instant (TMA_1).

Typically the decoding method will analyze the incoming signal and find specific packages, data fields etc., recognize the encoded data, possibly do an extraction, transformation, recasting in a for the apparatus useful format etc. E.g. it may output the time instants at which some specific action may or is supposed to happen. An apparatus connected to a decoder using such additional data may prescribe further ways of delivering (or even extracting particular data only) dependent on its use of the data. E.g. if the apparatus needs to only know the time instants of change of characteristic luminance, it may be sufficient to have only those, but an image processing apparatus may request the decoding unit to perform a decoding method which also converts encoded indices to pre-agreed transformations into a more manageable format, e.g. functions over a finite time segment for multiplicative dimming. I.e. all additional data will by embodiments of the decoding method be outputted in agreed formats, whether fixed predefined, or negotiated on-the-fly with the receiving apparatus, whether it are time instants, reprocessing indications, further data specifying the temporal nature of the signal such as image-dependent measurements, display-oriented, or film look-oriented guidelines, etc.

Further useful is a method of decoding additional data (DD) video data (VID), the method further comprising decoding and outputting any at least one encoded data entities as described in this text.

Further useful is a data signal (NDAT) associated with video data (VID), comprising at least one change time instant (TMA_1) indicating a change in time of a characteristic luminance (CHRLUM) of the video data, which characteristic luminance summarizes the set of luminances of pixels in an image of the video data.

Further useful is a video decoding apparatus (600) arranged to decode, related to video data (VID), additional data (DD) comprising at least one change time instant (TMA_1) indicating a change in time of a characteristic luminance (CHRLUM) of the video data, which characteristic luminance summarizes a set of luminances of pixels in an image of the video data, and output via an output (650) at least the at least one change time instant (TMA_1).

Further useful is a video decoding apparatus (600) arranged to decode at least one of the encoded data entities specified anywhere in this text, and further arranged to communicate to a second apparatus (100) capable of rendering the video (VID) those at least one of the encoded data entities, in order to influence the rendering by those at least one of the encoded data entities.

Typically various embodiments of the decoding apparatus will have various sub-units, such as a dedicated (part of an) IC or dedicated firmware or software at least temporally running on an IC, to e.g. look at a specific part of the additional data, comprising e.g. a reprocessing code, isolating that reprocessing code, and either send it unprocessed to an output of the IC, or send it to a conversion subunit to convert it into a digital (or analog) value or set of data which is more useful for a connected device. The skilled person will understand that the same data may also be sent in various ways a number of times via different outputs.

Further useful is an arrangement (110+100) comprising a video decoding apparatus (600) and a display (100) in which the display is arranged to change its rendering on the basis of at least one change time instant (TMA_1).

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display).

In the drawings.

DETAILED DESCRIPTION OF THE DRAWINGS

Figure 1:
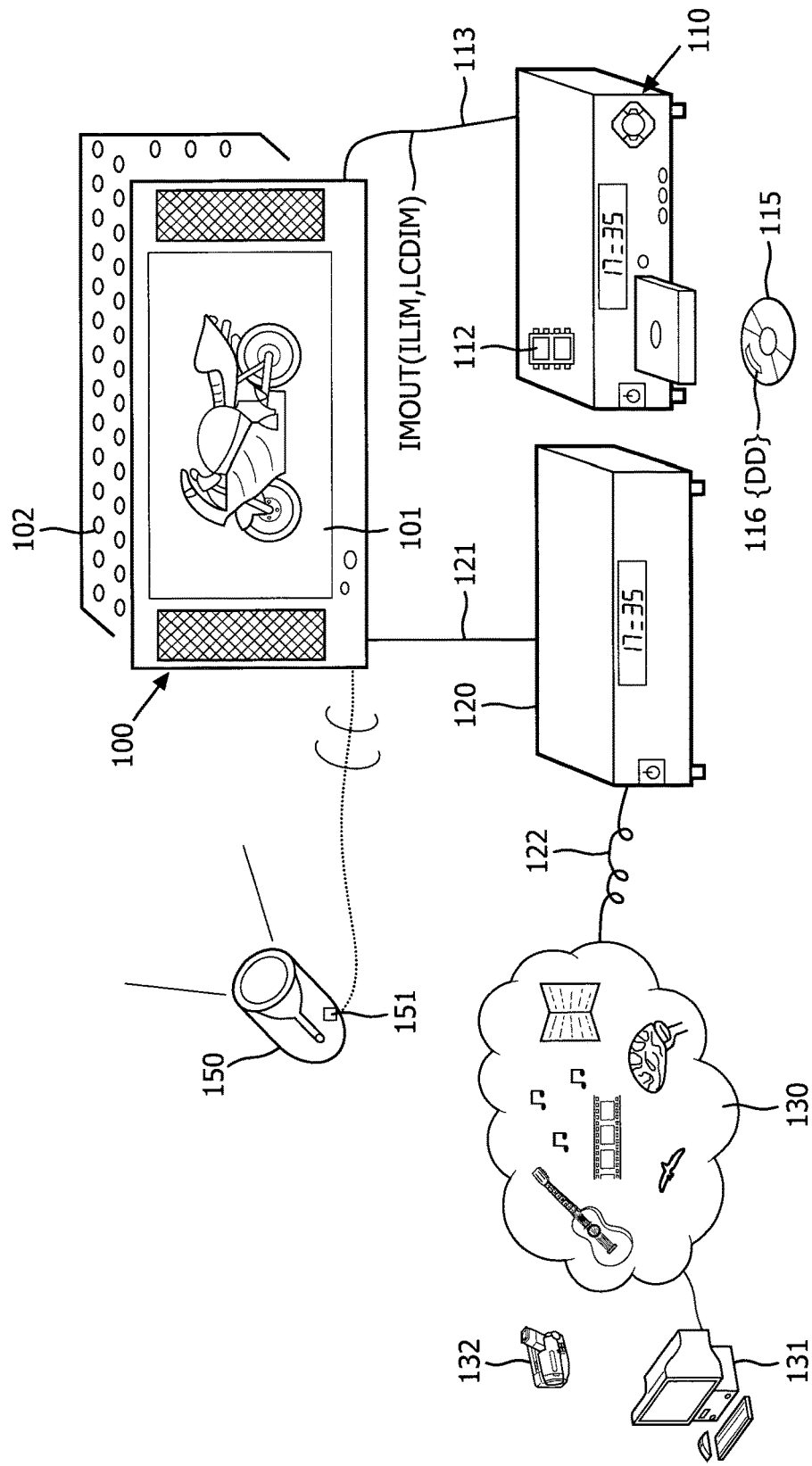
FIG. 1 schematically illustrates an exemplary video receiving arrangement capable of using the additional data DD as according to at least some of the embodiments described in the present text.

FIG. 1 describes a possible home video viewing arrangement, comprising a LED tv 100 (or a general HDR-capable display, or even LDR display, especially if it is more tunable in its rendering than just uniquely rendering the video VID), with an LCD panel 101 backlighted by a number of (white or colored) LEDs 102, which can display HDR images or LDR (standard, low dynamic range) images [in which case there may be a certain amount of video processing, at least to map to LCD and LED driving values] according to principles described above and in prior art. Note that the skilled person will understand that the principles of the present invention are also mappable to some other displays, e.g. a projector with a segmented illumination and a DMD, OLED displays, etc.

In an exemplary embodiment (which we will exemplary use for describing our technical principles), the tv/display gets its television or image signals over a connection (e.g. wired/HDMI, or wireless) 113, form a memory-based player, e.g. a BD player 110 (but of course alternatively the signals could come e.g. from a server over the internet etc.). This BD player 110 gets the encoded video from a bluray disk 115, upon which an additional track 116 is encoded with the additional data DD according to any of the embodiments of the invention described below (of course, such data may also be encoded according to many different principles, e.g. within the video encoding, e.g. in fields before groups of blocks, however, a separate set of data items allows coding over another channel, e.g. the internet, to be co-supplied).

Figure 2:
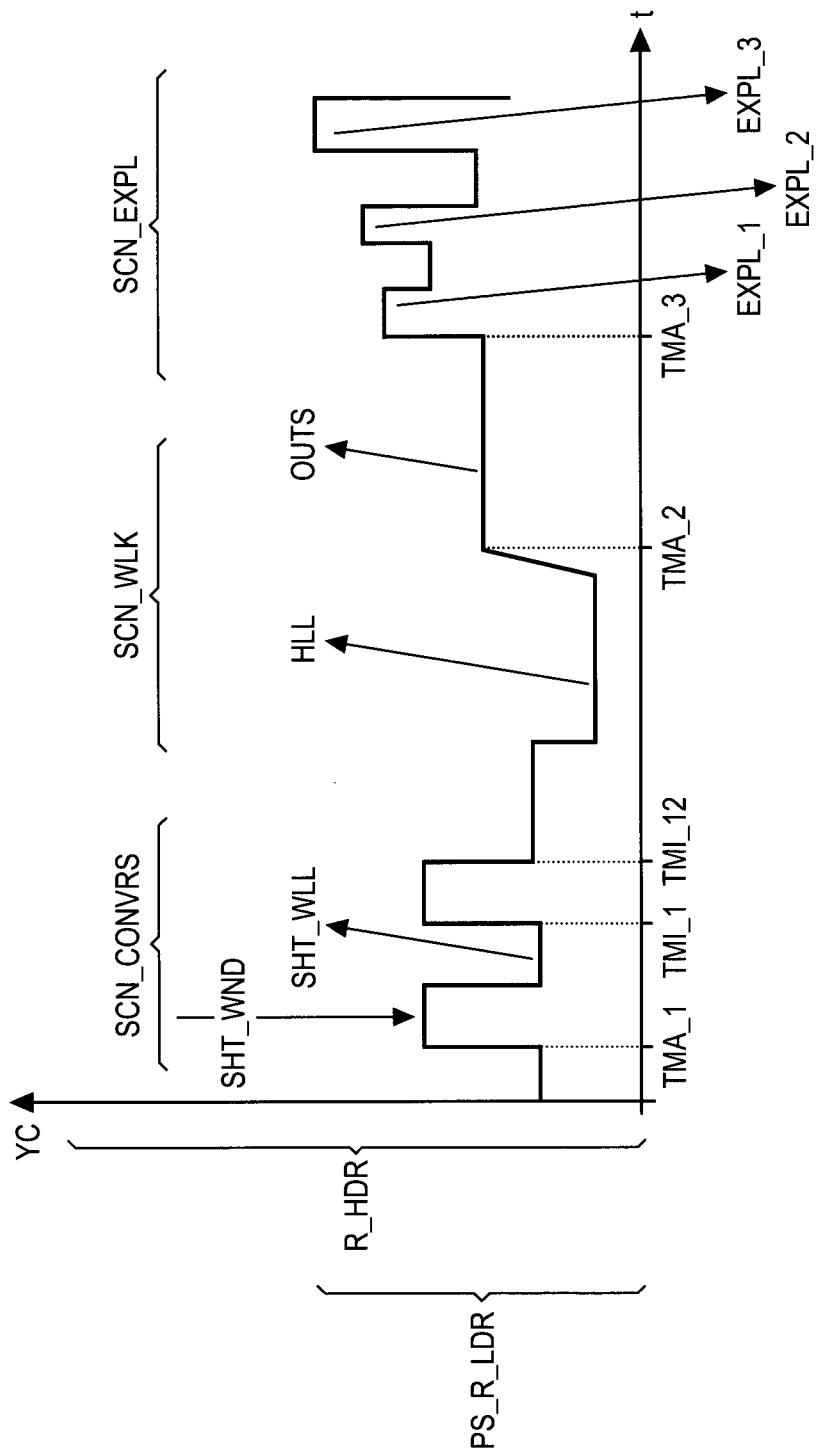
FIG. 2 schematically illustrates a representation of how the luminances of images in a video change to explain some examples of how at least some embodiments of the present invention work.

FIG. 2 shows a temporal profile along the time axis t of a movie (which may be any temporal succession of related images, e.g. a Hollywood movie, or a feed from a security camera) with a characteristic luminance YC for each image (at time t). This characteristic luminance is derived from all the pixel luminances present in that image, e.g. it may be a weighed average (since cameras typically also use weighed averages in determining their settings which lead to the distribution of the pixel luminance encoded in the image, so this will partially be reflected in their recording of the captured scene), but more intelligent histogram analysis may be involved. E.g., the luminances measured in the higher percentiles may at least partially contribute to YC, so that one can judge e.g. high key rendering of outdoors environments, sensor saturation, large very light local regions (also spatial properties may be taken into account in the algorithm for deriving YC, such as relationships of light and dark areas, or even histograms of dark regions inside light areas, e.g. to analyze a contre-jour capturing of a person (partially) in front of a window), etc. As to the temporal determination of the characteristic luminance, one could either determine it per image, or compute any mathematical accumulation formula over any number of successive pictures (e.g. as in FIG. 2, giving the same characteristic luminance to all images of a shot; between shot or characteristic luminance change boundaries). Note that a human being characterizing/ annotating changes in characteristic luminance may use various indications, and he can also demarcate boundaries between temporal regions which are supposed to have different characteristic luminances (at least in the processed (e.g. HDR or pseudo HDR) output image for the display) but which differences may be difficult to calculate with an automatic algorithm (e.g. specifying a set of alternate rendering intents, e.g. for different displays).

This characteristic luminance can be used to determine where a difference in scene capturing characteristics occurs, which e.g. has to be translated in a different rendering on the display, in particular, a different driving of the backlight LEDs. Taking the contre-jour example, the skilled person may understand that display processing (whether pure software-based changing of the input image, or hardware-related processing, such as optimal driving of the backlight) may be such that it either improves this picture (taking into account implicitly (average case) or explicitly all display and viewer related aspects, the display may e.g. render the different luminances of the person object in the image in a more visible way), or, especially with new HDR displays, the rendering may become worse visual quality wise.

A first part of the movie, a conversation scene SCN_CONVRS, describes such a situation. It consists of alternating first shots SHT_WND of a first person sitting in a lighter part of a room, and second shots SHT_WLL of a second person sitting in a darker part of the room (or for the purposes of this explanation, a similar scenario and related technical processing may occur when interleaving a sequence of indoor and outdoor shots). Taking account of both artistic scene lighting conditions and the (human or automatic) camera exposure settings may partially mitigate the difference (making both shots well/average exposed), but may also retain a certain difference (e.g. the director of photography wants a particular look by contrasting the two). However, when mapping all the pixel luminances underlying these characteristic luminances to a HDR display (e.g. the stretch involved in mere mapping of the {0,255} LDR signal to a {0, 1024} HDR signal and to a {0, 2000 nit} HDR range of display output (region/pixel) luminances instead of a {0, 500} LDR display range), not only the particular look may be compromised, but even the bright window regions may hurt the eyes of the viewer, or at least displease some viewers. The situation is schematically illustrated in FIG. 2 by means of a mathematically derivable characterizing low dynamic range PS_R_LDR within the driving space for a (particular) HDR display R_HDR. This could be a {0, 255} LDR range, but typically it will correspond to a range in which one would represent normal scene luminances (such as well-exposed interior or exterior object reflections) and not yet optimized HDR effects, such as explosions, lights, etc. One may want this range not to be boosted too much in HDR, but keep it rather mitigated, LDR-like. Before rendering on the HDR display, the image described in the characterizing low dynamic range PS_R_LDR, will have a processing to typically map the effects to a HDR effect range R_UPEFF (see FIG. 3) and a lower range R_L_HDR for normal objects. Note that this is just one possible schematic example for illustrating the present inventions and its embodiments. The input image could also already be a HDR encoded—e.g. {0, 1024} or {0, 65536} with any tone mapping or other luminance meaning—image, or a medium range encoded image, which may still need processing according to the present inventions. Actually, the skilled person should see this schematic picture as if the described technology was only applied to an average (or median) luminance for the picture. In reality any complex operation to any of the pixels present in the input picture can be applied (especially for the analysis of the picture as to where characteristic luminance changes occur, but also for the (re)rendering of those), but for simplicity of explanation, we will describe only shifts (e.g. multiplicative scaling) of the luminances, and describe this as a scaling of the backlight (i.e. also the LCD driving values may change in correspondence to the LED driving changes, but we will at present ignore that in the description).

A human or automatic analysis algorithm has identified time moments along the movie, in which the characteristic luminance changes (and hence the backlighting needs to or may change), such as a major change time instant TMA_1 when the characteristic luminance of the conversation scene SCN_CONVRS starts, and minor change time instants TMI_1 and TMI_12 (etc.) in that scene for switches between the lighter and darker shots SHT_WND and SHT_WLL (n.b. simpler automatic algorithms may be limited to determining major change time instants only). Most simple embodiments of the present invention will only encode such time instants, and whether any HDR processing is allowed at all (e.g. via a Boolean ALCORR, which forbids or forces to a very basic scenario the HDR display side processing if it is equal to 0, but allows e.g. a smart boosting strategy if it is equal to 1). This allows that the display (or preprocessing apparatus, such as the bluray player, settopbox, computer, etc.) can apply smart processing instead of blindly applying its single algorithm, whatever the present movie content, its artistic intentions by the creators, or its future content.

Figure 3:
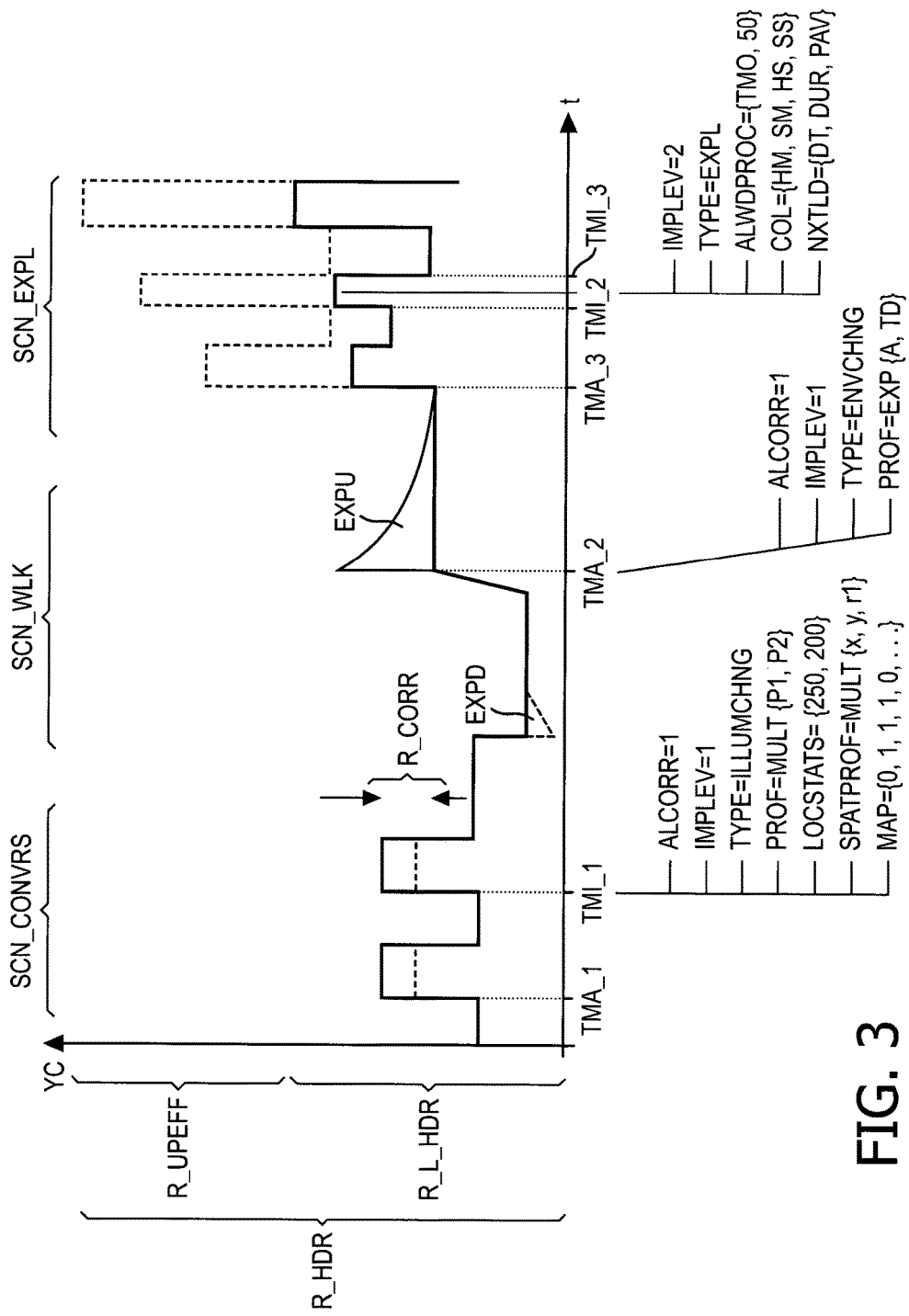
FIG. 3 schematically illustrates processings one would apply to that video, to come to a more satisfactory rendering on a display.

Some desired image processings, as well as several possible data encoding embodiments, are schematically illustrated in FIG. 3.

Psychovisually, we have different rendering needs for the "static" (steady state) scene SCN_CONVRS and a second scene SCN_WLK in which one of the persons first walks into a dark corridor, and then (around change time instant TMA_2) comes out into the bright sunlight. The artists may desire the rendering to create some specific final look, but have not sufficient control with only the image pixels encoding by itself. In particular, the camera captured values after setting camera exposure may actually be similar for scenarios with different rendering intents like the above two examples, especially for legacy video. In that example the window coming in and out of view is more of an annoyance rather than a desired effect, however, dependent on display capabilities, one may want to make something exciting from the person walking between indoors and outdoors. But if the combination of camera operator and grader is more straightforwardly coding the scene rather than in a brilliant way, one may still be stuck with rather similar pixel color/luminance values in both scenarios. Adding the issue of how a display intends to deal with those ("blindly") it seems desirable to have an additional mechanism of information encoding and preferably rendering control. In SCN_CNVRS, although the artists may desire to show the difference in lighting to a certain extent (which may include different backlight driving as well as different pixel histograms for the image for the LCD, and as input coding either a different total HDR signal, or different hints for backlight setting in addition to a standard image coding), he will do so under an assumption that the eye is largely adjusted to the situation for both types of interleaved shots. I.e., the fact that the viewer when outside for a certain time, or looking at the person in front of the window for a certain time, has adjusted his retinal sensitivity characteristics, should be reflected in the encoding of the image to be rendered, but most importantly in the rendered image itself. In particular, a characteristic luminance for the outputted display image (and typically such a luminance to which the eye will respond with its biochemistry, e.g. attempts to stabilize and encode differences upon attempted steady state, e.g. average luminance), should be such that the rendered scene is not annoyingly flickering, visually fatiguing, etc. This was not so much a problem with older displays with their limited ranges, but more so with emerging bright displays (even with LDR content), and will especially become a point of attention for future HDR displays. Hence, the display may want to keep the difference in characteristic luminance limited for such scenarios as SCN_CONVRS, e.g. not boost (the signals and hence their difference) too excessively (i.e. use a small subrange of the total HDR range R_HDR for all or most of the video pixels in all images of that scene), or even reduce their difference (i.e. as display output luminances, compared to what a characterizing low dynamic range PS_R_LDR would give if outputted, e.g. PS_R_LDR emulating on the HDR display how a 500 nit LDR display would render that temporal part of the movie, by mapping within that range [an exemplary temporally adapted gamut mapping embodiment]). E.g. the rendering or signal calculating apparatus may reduce that local range, or luminance spread of some parts of the video pixels falling within that range (e.g. the pixels most contributing to the characteristic luminance summarization), e.g. it may lower the luminances of at least some of the pixels (say of the clipped view of the outside world). Additionally it may increase the luminance of the darker parts of the environment, at least the region in which the second person resides. It will be understood by the skilled person how per pixel luminance modifications modify the characteristic luminance and vice versa, which can be done by several simple or statistical methods.

Contrarily, for SCN_WLK the artist wants to render a dynamic brightness variation. The person walking into the corridor first suffers from retinal insensitivity blindness (because the environment is darker than his adaptation state), and after having adapted, when he walks out, he is blinded by the bright light outside (overexposure blindness). The artist may already have simulated this to a certain extent (or even the camera auto-exposure, but will assume for the present discussion that at least for quality movies and not on the fly television the artist has that under control), even with an LDR {0, 255} signal, e.g. by making the image high key (many bright, maybe even overexposed regions with low contrast, i.e. a histogram which largely resides in the upper half of {0, 255}). However, such an image/video may look better (high brightness rendering gives a different look to the encoding precision of certain regions, e.g. due to the dependence on human just noticeable differences JND on local luminance) or at least more convincing, when (in addition, or even predominantly instead) there is a real brightness change. This may be realized e.g. typically by boosting the backlight (leaving the LCD signal either unchanged—e.g. the {0, 255} input signal being used as estimate of the object reflectances—or adapted, e.g. optimally reprocessed matching the backlight change [which may be different for different displays with different capabilities]). Similarly, making the signal dark may emulate the visual incapability (one can only see the largest differences prior to adaptation, so this can be emulated by encoding fewer values), but the real visual impact will take place when the backlight is also darkened, or in general, the HDR display uses its optimal rendering strategy for such dark shots.

So for SCN_CONVRS one wants the display to "do nothing" (or at least not apply serious boosting, or even stretching unavoidably linked to default mapping onto larger output luminance ranges) whereas for SCN_WLK one wants to maximally use the capabilities of the (HDR) display, by applying a (display rendering !) visual effect (for simplicity herein described as mainly a backlight driving change). Similarly, for a third scene SCN_EXPL with explosions, one wants to apply a different effect, and the rendering should preferably also be different for different kinds of captured explosions (see below).

The desired limited difference between the pixel values of the respective images of type SHT_WND vs. SHT_WLL can be specified in a number of ways, and if the image processing operation to achieve it is of the luminance shifting type (multiplicative or additive) in general it can be specified similarly in a characteristic luminance representation (i.e. in practice one will simply embody the current teachings in classical image processing operations working on sets of pixels).

E.g., the artist (or automatic annotation algorithm (we will assume in the further explanation that all encodings of the invented embodiments are determined by a human, but most of them can also be determined automatically by applying image analysis) may specify a range R_CORR for the characteristic luminances to occupy (possibly augmented with further specifications on the histograms of the image objects, such as a span of luminances, or a range for the upper and/or lower luminances to fall in, etc.), which range may be determined relating to a reference display range, e.g. a particular low dynamic range PS_R_LDR, or a reference high dynamic range, etc. Displays having an actual display dynamic range can then do their processing to have the output luminances look as conform to the range specification as feasible, e.g. a display with a higher dynamic range can allocate a subrange to emulate the reference low dynamic range, or in general any display may apply a processing which results in an output deviating minimally from the desired look/range. The similarity in characteristic luminance (and the underlying pixel histograms) can also be specified in other ways, e.g. as an allowed or preferred percentage of change (up and/or down) which can be used for multiplicative processing. "Allowed" refers to that the artist disallows greater deviations than a certain amount, and the processing by the display should at least maximally trying to conform to this, or fully if it is to be compliant, whereas "preferred" gives a preference by the artist, and the display may only want to take such indications into account when doing its own processing [e.g. calculating new driving values for the current viewing environment, viewer preferences etc.], so that it will at least try to obtain a similar look, but it may deviate from that.

For the SCN_WLK example, the display may want to apply a profile, determined at least partially by the encoded time instant. E.g., it is known that the human eye adapts temporally approximately according to an exponential curve, so measurements like JND will also follow this curve. The display may boost the backlight e.g. with an upward exponential function EXPU, or another function which first exaggerates the lightness, but then relaxes again to a lower characteristic luminance, which on the one hand simulates viewer adaptation to a comfortable display brightness, but on the other also puts the driving somewhere in a central region of the total range R_HDR, so that there is still sufficient room in the not unbounded display range for the rendering of other environments, e.g. explosions. This works because psychovisually the effect is the greatest upon its first occurrence, and then the viewer's eye starts compensating for it partially, so there is no need to spend this additional backlight power anyway, since it brings less to the visual experience.

Similarly, for the dark corridor, a downwards exponential EXPD may be applied.

Figure 4:
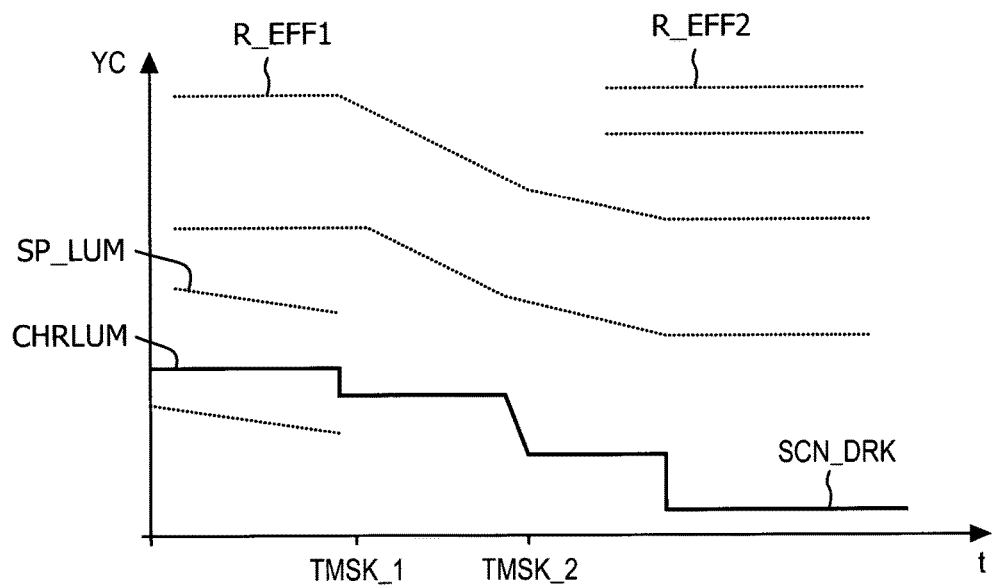
FIG. 4 schematically illustrates some more processing, for a specific example of rendering a dark scene.

At present, since most of the focus of image quality (and even HDR) has been on additional brightness, the rendering of dark scenes has received less than the needed attention. FIG. 4 elaborates with a possible example how with the current invention improved rendering on displays can be done for such scenes (which now largely fall below what is visible, let alone that the desired rendering effect is achieved). E.g., a dark coat of a person in a somewhat brighter but still dark environment in the image, will only be faithfully rendered not only if the current viewing conditions (display driving, and viewing environment) are good, but also if the viewer is correctly adapted. Thereto, the successive images rendered in the past can prepare for that adaptation state, by lowering the luminances of the pixels in those previous images, preferably in a gradual way, so that it is not too noticeable, or at least not too objectionable (to the viewer or the artist). The display could do that automatically by knowing which characteristic luminance CHRLUM level it should achieve in the future for the dark scene SCN_DRK, or the exact or preferred/approximate diminutions can be specified in or alongside the video signal (e.g. by the artist). It is possible to encode particular time instants TMSK_1, TMSK_2 on or during which such diminution preferably occurs to make it less perceptible, e.g. upon shot boundaries, or for surround pixels surrounding a face when it is expected the viewer watches the face, etc. Also the high range R_EFF1 for bright objects, such as explosions (in the night) may be gradually lowered (so that on the one hand, the viewer will not adapt too much to them anymore, but on the other hand they will also not stand out too much from the other luminances, e.g. leading to an exaggerated or even blinding viewing experience). The analysis algorithm of the temporal content (whether done by the receiving display on its own, or an image analysis for encoding more precisely in additional data how the receiving display should render) can also look at a visual brightness budget of certain time slices, which encodes such aspects as: how bright objects (e.g. explosions) are, how large they are, how long they last, how many there are in succession, how they contrast with darker subperiods, etc. Short small bright illuminations may then e.g. still be allocated to a higher range R_EFF2, whereas the bright regions which have a larger influence on visual adaptation will be rendered in the decreasing high range R_EFF1. Also the relationship between the characteristic luminance CHRLUM and the underlying image pixel values within range SP_LUM may change. E.g. one may derive from the input encoding an estimate of approximate object reflectances, yielding an output image, and on the basis of that image (or any derivation from the input image) apply a slanted transform which makes bright objects a little darker and possibly also darker objects. Actually, as a simple approximation, on can consider the characteristic luminance as described hereabove as a 1-value determination of a range of luminances (say the average), but other embodiments could additionally or alternatively encode other measures characterizing the luminances in (a subset of) an image, e.g. a range (processing from a low range to a larger boosted high range e.g. can then be specified based upon the respective boundaries of those two ranges). We will in general conceptually call all these possible summarization encodings characteristic luminance, but to keep the explanation simple limit our explanation to 1-value characterizations. This system works particularly well in cooperation with controllable surround lighting lamps 150, such as Philips living colors lamps. These lamps may be fitted with a (e.g. wirelessly communicating) driving controller 151, which can be driven by any unit of the arrangement (e.g. controlled by the display) in dependence on the additionally encoded data according to the invention. E.g. at the first time instant TMSK_1 it may be switched off or dimmed to 50%, or more intelligently, it may be dimmed in accordance with the characteristic luminance CHRLUM. In general the lights may be set optimally dependent on the temporal video luminance characterizations.

Returning to FIG. 3, a profile may be derived by the display itself, or preferably, it is encoded by the content production side. The signal may include several predefined classes under a profile PROF code (which the receiving side, its decoding IC, and its processing IC can understand and handle), e.g. multiplicative MULT, which means that during the entire shot (or in fact temporal period between two time instant codes) only a multiplicative scaling (either of the HDR signal itself, or of the decomposed part corresponding to the backlight, or a combination of those) may be applied. The modification profile may be further parametrized, e.g. with P1 being the amount to lower (e.g. 80%) and P2 the amount to increase (e.g. 120%). Different parameters still allow different displays to choose one or another option. For SCN_WLK the profile type is an exponential EXP, which the content encoder may supplement which such parameters as a starting amplitude A, and a decay time TD. In general, a receiving side apparatus may also determine by itself the time interval DTI during which a deviation from a first value (such as a characteristic luminance representation of the input video, or an according to a first algorithm calculated set of backlight driving images for that video input) is needed, e.g. by taking into account information on the future of the video (see below). Such an exponential can also be used to decrease the luminance of an explosion which lasts for a long time, e.g. because it is artistically frozen in a stretched time representation. Although the original signal may encode that explosion in all its details including its original captured luminance (because that is how the camera with its exposure settings kept recording it), including the exponential allows reducing the luminance of that blast gradually, not negatively impacting visual quality, however allowing e.g. for a power reduction (a temporal, content-driven equivalent of what one would otherwise do statically).

Also, with a few such basis profiles (e.g. exponentials, or linear segments), the content provider or re-coder (of previously encoded material) can produce complex temporal profiles. These can be used e.g. to apply HDR effects to legacy material. E.g., a legacy movie may contain a scene of a supernova with outward rippling hot gas rings, which was however encoded rather plainly in {0, 255}. Instead of applying a full computer graphics prediction (or re-rendering) to arrive at a HDR {0, 65K} encoding of that scene, one can apply according to the present invention temporal profiles (typically but not exclusively for driving the backlight)

starting at a certain time instant e.g. TMA_3 after which the HDR effect is required. By allowing the encoding of such an (almost) arbitrary temporal profile, and also variable over space, one can e.g. define a spatio-temporal multisinusoidal profile rippling outward in the image component destined for the LED backlight in approximate synchronization with where the most luminous gas clouds are in the original (or processed) {0, 255} picture to drive the LCD. Thereto spatial characterizations SPATPROF of the temporal profiles can be encoded, e.g. a multiplicative shape, such as a multiplicative constant defined in a circle with origin (x,y) and radius r1. But more interestingly, temporal map encodings MAP may be co-encoder, which may be 2 dimensional or 3 dimensional. This may be done e.g. taking a reference resolution for a backlight image (e.g. 50×50, which can comprise various aspect ranges from portrait-positioned 2:3 data reader, to 21:9 television), which can be resampled for an actual display backlight. This map may include e.g. binary numbers for the regions (1=heavily loaded during an upcoming time span, 0=less severely loaded), or local accumulated driving (which can be used to predict and counter-adjust local heating, aging etc.). In that case a 2-dimensional array of numbers is encoded, e.g. {10, 10, 10, 40, 55, 45, . . . } being the integrated luminances of reference LEDs until the next encoded time instant, or the next 10 minutes fixed agreed interval, etc. A three-dimensional MAP may include far more interesting local spatiotemporal data (parameters or an actual spatially local temporal function), such as can be used e.g. for effect coding. In the former case the map just contains measurement data, with can be used as interesting informative data for the display optimizing, regarding e.g. its heat management image reprocessing, whereas in the latter case it can guide or even mandate the driving of e.g. LEDs by backlight map resampling. Note that any strategy for temporally modulating a backlight can also be converted to a single HDR driving (e.g. for an OLED display) and vice versa, so any encoding embodiment can also be employed for (guided) reprocessing in the (HDR) color space for driving the display.

A number of HDR rendering types TYPE (changing the scene illumination ILLUMCHNG, changing the local filming environment ENVCHNG, effects like explosions EXPL, etc.) may also be agreed in a standard way for communication between content production and display rendering, and the video may contain a script that if the display needs or wants to e.g. reduce the backlight to save power (e.g. in an eco-mode of lesser viewer interest), it skips the effects of walking from a dark environment into a light one, but not the explosions (or more or all of the environment changes before it starts tampering with the explosions). Or, limits may be put on the scene illumination type renderings, etc. Additional parameters may aid in the processing by a unit at the display side, e.g. local statistics LOCSTATS may indicate that the biggest problem of too high pixel luminance is in a clipped (window) region above 250 pixel luminance code, that a larger amount of color deformation may be applied for original encoded pixel values above 200, etc.

Another useful embodiment allows determining a hierarchy of temporal renderings (e.g. effects such as explosions). Thereto an importance level IMPLEV may be encoded. Looking at the three successive explosions of SCN_EXPL we can see two things. Firstly, many explosions after another may not have such a big impact on the viewer (and this impact will highly depend on the display and viewing environment, e.g. on a mobile movie viewer in a bright surround, one could better have two bright well spaced [maybe even increased in duration] explosions, with a deeper dark modulation in between, than three nearly identical concatenated explosions, adding only a perceptual difference onto each other, which effect may only be pleasurably seen on the higher end displays and under better viewing circumstances). Secondly there may be an excessive power consumption and even overheating when one stretches the display to its limit with so many explosions after each other, i.e. the video content may be in discordance with the physical constraints of the display.

The explosions increase in characteristic luminance (e.g. average luminance over the fireball, or a luminance of a sample characteristic of the fireball). In the original input image coding range (or any derivation thereof) there may already not be too much space to encode them. Typically, captured luminances near the range boundary of an encoding are encoded progressively non-linear (soft-clipping). Such a function may be co-encoded, or estimated at the decoding (or transcoding) side, even if very approximately. Anyway, the final luminances for display output may be further apart, if there is a large range for the effects (R_UPEFF). However, in view of decreasing sensitivity and impact for the human viewer, an additional boosting of the explosions may be in order, and a large number of successive explosions may no longer fit in the available range R_UPEFF. A useful concept is a "well noticeable difference" WND. This may be defined e.g. as a number of JNDs, and form a basis for an impact scale for encoding by the artist. The processings to be applied can make use of encoded impacts, e.g. as a guideline for a number of WNDs between successive blasts. This can be done via profile PROF encoding, or more explicitly by means of encodings of allowed processing ALWDPROC, e.g. a tone mapping on the brightest half of the image.

But also, the importance level allows dropping, or seriously discoloring certain temporal renderings. Whereas the first and third blast have IMPLEV=1, the second one has IMPLEV=2. This means that it may be dropped (or deformed) to make room in the luminance range for providing a more optimal visual experience with the initial and final explosion. Also if for other reasons changes in rendering such as (local) backlight dimming are required, the display may start with the highest importance level, e.g. IMPLEV=3, then IMPLEV=2 time spans, etc. In order not to fully reduce or deform the visual impact of the second explosion, what is lost in backlight driving may be partially compensated by making the pixel values of the image for the LCD excessively bright. This can be done automatically be the display by an approximate LCD image compensation, or explicitly encoded by particular tone mapping processings ALWDPROC. Also the visual impact may be simulated by locally changing the chromatic parameters of the LCD or backlight image, by means of a color specification COL, which may comprise e.g. a hue difference for the main object or region (in this case the explosion) HM, a saturation difference for the main object or region SM, and a hue and saturation difference for a surrounding region, e.g. the rest of the image(s).

Interesting for physical-constraint-based image processing are such future characteristic luminance related parameters NXTLD like the time to a next excessive characteristic luminance DT (e.g. with a predicted reference display backlight driving above 80%), a duration of excessive characteristic luminance DUR, an average luminance or power spent over a time interval in the future PAV, etc. Such information, e.g. the time to a changed characteristic luminance interval, can be used to determine the temporal profiles by the display, by formulae modeling e.g. human vision or energetic behavior of the display. E.g., one may calculate a backlight dimming profile based on a derived final specification of the backlight loading in say the coming 30 seconds or 5 minutes, and scale an exponential based on e.g. a number of values or classes of the final specification.

Figure 5:
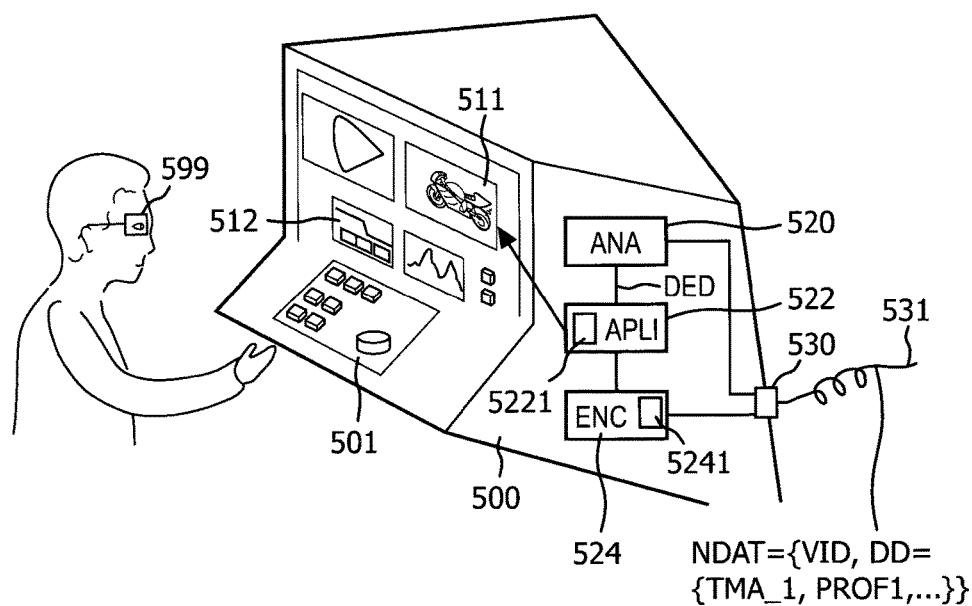
FIG. 5 schematically illustrates a creation environment, to create additional data DD.

FIG. 5 shows schematically an exemplary embodiment of an arrangement for a color grader 599 of movie post production (or he may be operating a semi-automatic annotation of legacy video), arranged for encoding the various annotation data according to the present invention (it will not help conciseness enumerating all possibilities, but the skilled person can determine them by analogy starting from the described examples). We note that in principle also automatic apparatuses can embody the present embodiments, e.g. a preprocessing device at home for optimizing for a particular display during the night an obtained movie, however we will exemplify the concepts with human grading. The color grader has a grading apparatus 500, which comprises user input means 501 for specifying various selections, parameters, etc., typically with buttons with fixed meanings such as "next 10 seconds of video", "show/hide current hierarchy of minor time instants", "add a time instant mark", an alfanumerical keypad, rotating buttons to determine a hue or advance a temporal selection of successive key video images, etc. He also has several displays, e.g. a reference HDR display 511, and a display 512 for temporal analysis of the movie. E.g. a number of key frames are shown, with a precalculated characteristic luminance profile, and the color grader can on the basis of this insert his time instants, double click them to open a page for encoding additional data, type his type ILLUMCHNG, and additional data such as statistical parameters, which can be easily supplied by means of helper applications running on additional displays, such as a color plane. All automatic precalculations are done by an image analysis unit 520, which determines various parameters described above, e.g. a characteristic luminance profile, if desired initial time instants for changes in characteristic luminance profile, initial codifications of other encodings such as preferred profiles to be applied on the rendering side. The color grader can then easily accept or discard proposals, and in the second case come with his own, human-supplied versions. An application unit 522 applies all the current applicable encodings, and can send these via a viewing subunit 5221 to the different displays (e.g. a selection of optimal key images around the determined time instants TMA_1, TMI_1, ... for viewing on display 512, and a final look for viewing on the reference HDR display 511. One of the buttons on the user input means is reserved for quick toggling between different reference displays typical of what is out there in the consumer's living rooms, e.g. a 500 nit display simulated on display 511, a 1000 nit display simulated on 511, etc. These simulations may include several (e.g. worst case) scenarios of image processing a particular display may potentially apply, such as an eco mode or a sharpening. The color grader can then quickly see the impact of all his decisions, whether he loosely encodes a single guidance which allows displays to apply still a very variable amount of processing, which leads to very different final renderings, or whether he more tightly encodes a set of specifications for different reference scenarios (e.g. old LDR display, medium range display, .../dark vs. bright surround ...), which the display must then try to conform to as tightly as possible by selecting the most appropriate specification. Finally an encoder 524 encodes all the data according to any prescribed format (e.g. co-encoded video+ data signal NDAT), and sends this via an output 530 to a connection 531, e.g. to a storage device, from which then later e.g. a BD or DVD is burned, or which final encoding (video+additional data) is then sent separately or together to e.g. a cable content provider via a satellite, etc. The encoder may encode the time instants in predefined formats (see below for an example), and may further comprise a reprocessing strategy indication formatter 5241 to encode what may be done around the time instants at the receiving side in predefined formats. E.g., the encoder may in a number of fields (e.g. 10 reserved fields) write an index number of a type of processing that may be done (e.g. field 1="1" means linear diminishing of current intended output luminance with slope in field 2="x").

Figure 6:
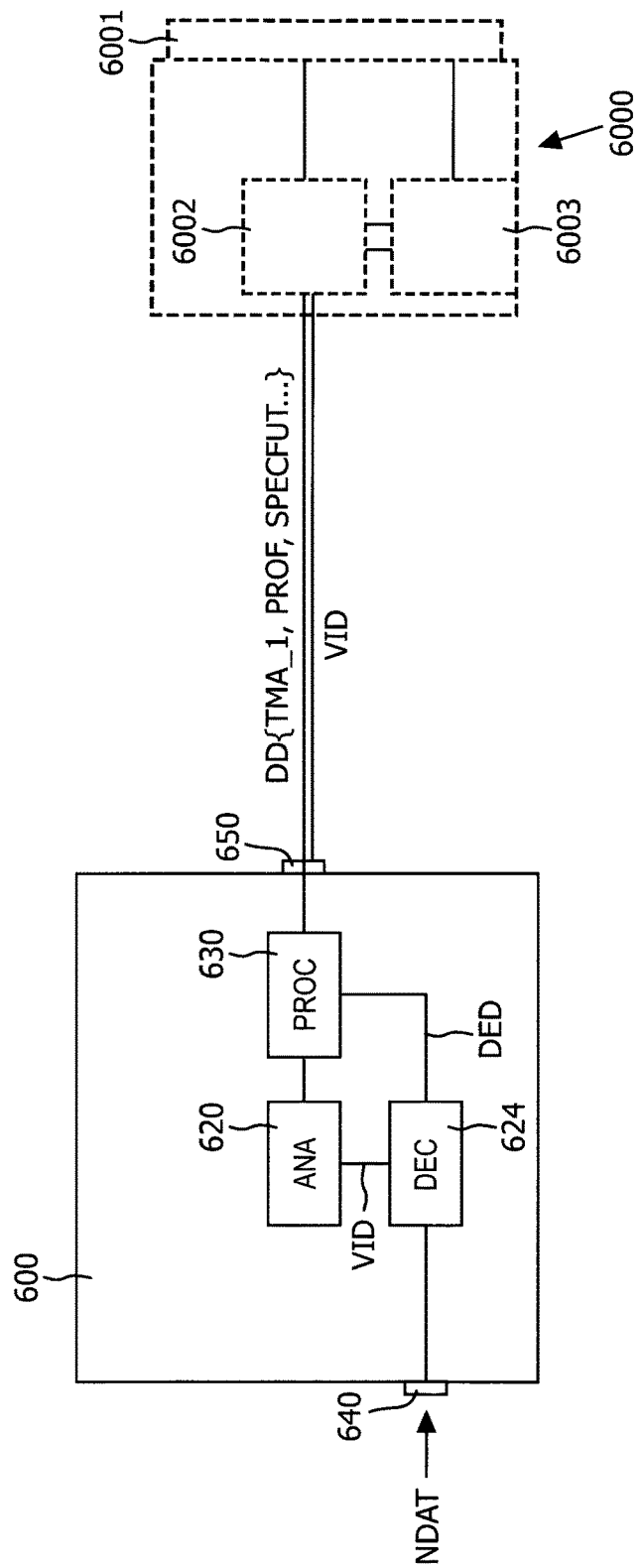
FIG. 6 schematically illustrates a decoding apparatus for decoding the additional data DD.

On the receiving side, a video handling/decoding unit 600 (as shown in FIG. 6) may be incorporated e.g. in a video processing apparatus comprising a disk reading unit (in the example of FIG. 1, this video handling unit is an IC 112 in BD player 110, but it may also be comprised in the TV, a computer in a home network connected to the display, etc.). The IC 112 and/or the BD player may generate as output a signal suitable for driving a display, e.g. an output image encoding IMOUT comprising a backlight driving image component ILIM, and an LCD driving image LCDIM. The video handling unit receives encoded video via input 640 (e.g. from a BD reader, a cable connection settopbox, etc.) and comprises a decoder 624 which can decode the video (typically backwards compatible, i.e. e.g. encoded according to an MPEG standard such as AVC), as well as the additional data according to the present inventive embodiments, such as the time instants TMA_1 ... of changes in characteristic luminance, and further specifying encodings of such time intervals and the video in it (type, statistics of the video, mapping profiles to be applied, etc.). The video decoding unit 600 typically also receives and decodes information relating to luminance/color reprocessing around or defined by or with regard to the time instants TMA (e.g. TMA may define an operation for much later). The video handling unit 600 may typically also be arranged comprising video analyzer 620 to do its own analysis of the decoded video VID, for applying its own video processing (for example, the display may prefer to apply its own particular effect boosting even ignoring the profile specifications of the present invention, but then still this can at least be aided by knowing interesting time instants TMA_1; also video processing possibly less related to the present invention may be applied, such as grass texture improvement). The final video processing, based partially on own analysis from video analyzer 620, and partly on the decoded additional data DD according to any embodiment of the present invention, is done by video processor 630, and the resulting video encoding (typically for the FIG. 1 example an LCD and LED driving image) is sent via output 650 to the display. We have also schematically shown in dashes a connected display 6000 (of course the decoding capable video handling unit 600 could be connected to another apparatus, e.g. a transcoder, or storage device, etc.). In case a smart display is connected, typically the video handling unit 600 will output still a lot of the original information DD (even if it already created its own optimal video signal), e.g. a specification SPECFUT of how the characteristic luminances are going to change in at least one or several future time segments. The display may use this data to come to its own final signal for rendering on its display panel 6001, e.g. it may comprise a viewing experience optimizer 6002 arranged to determine an optimal video driving according to the display's preferences.

The additional data DD can be encoded in a signal in different ways. E.g. in main header at the start of the video may comprise most of the field, e.g. a list of time instants TMA_1 . . . with specifics, such as whether and which processing is allowed by the television, e.g. a field starting with keyword COL and 4 parameters behind it (HM to SS). Or DD may comprise a composition of linear segments characterizing a characteristic luminance profile or other profile for the upcoming images, a 3D LUT with spatial positions and as third dimension point data of a curve or a sparse list of parameters, etc. But also e.g. the header of an image or GOP or group of blocks may contain (typically less) data of a soon to come future, such as the time to the next characteristic luminance change and its type. Hence, the data DD can be encoded inside what is seen as the video signal VID (e.g. using predefined open catch-all reserved data structures in it such as SEIs) or outside it (e.g. on a separate storage, and via a separate signal path), but relatable to it. This encoding can be used e.g. in a service in which an identification of the video VID (e.g. a title+ other specs., or a watermark) is sent to a service provider, which then sends or provides access to the additional data DD. For other video, like e.g. consumer captured video, the entire video signal VID may be sent to the provider, but for such a scenario (where there is no generally known video data as with a movie), DD is preferably be stored (perhaps outside VID, but) in close connection with VID, e.g. on the same removable storage, if not the same hard disk then the same home network storage, etc. This will especially be true if one of the consumer's own apparatuses (e.g. settopbox, laptop computer) does the video analysis and provides the additional data DD.

Figure 7:
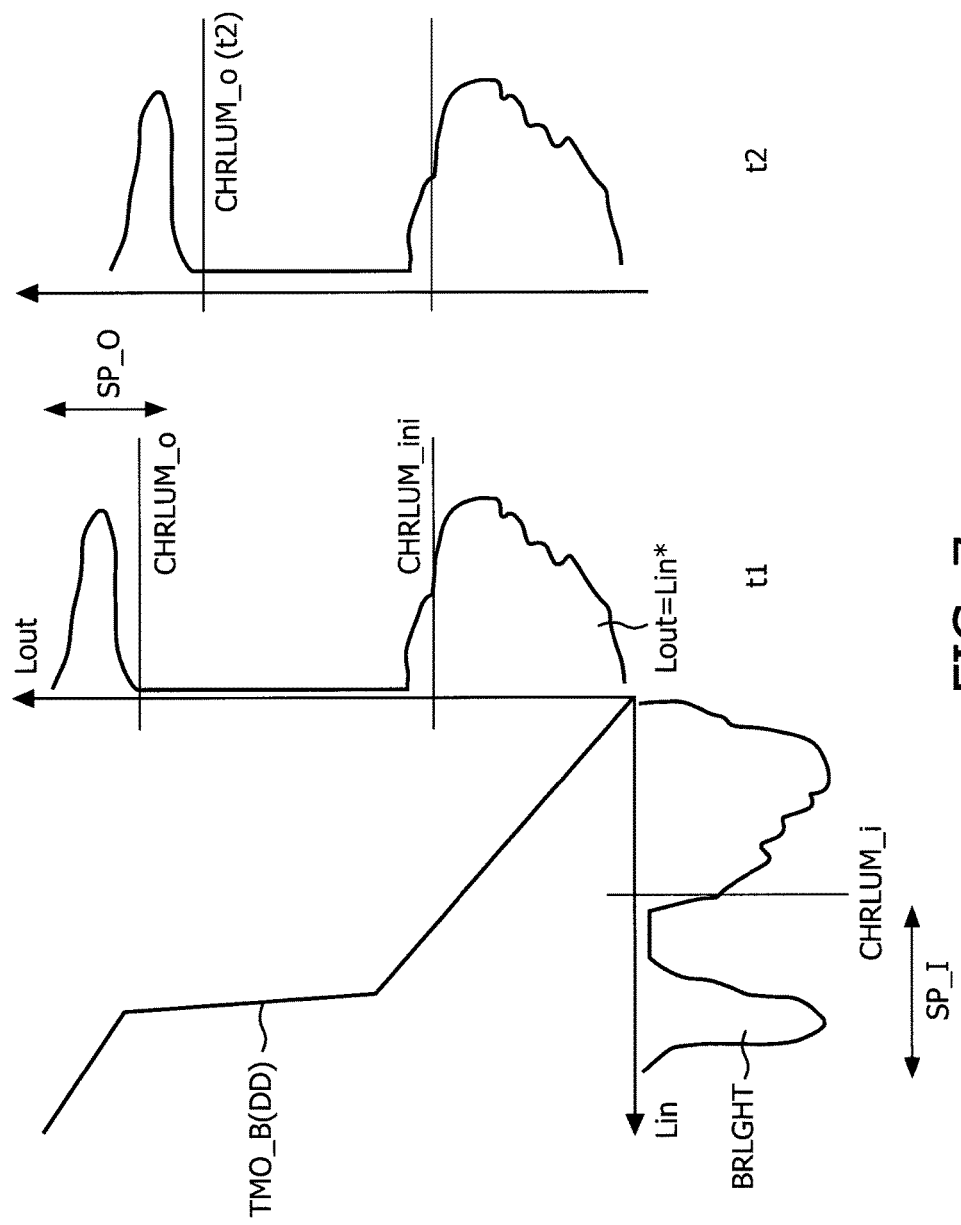
FIG. 7 schematically illustrates the mathematics behind the usage of the additional data DD.

FIG. 7 illustrates in more details an exemplary embodiment of what happens mathematically when an apparatus uses the additional data to arrive at a desired video rendering, and the relationship behind a characteristic luminance, and the underlying pixel luminances of the video images, and in particular their histogram. We assume for simplicity that the input image (which histogram is shown on the bottom of the graph, which increasing pixel luminance Lin leftways between 0 and 255) is LDR encoded, and has a single bright region with partial histogram BRLGHT. This input image can be characterized with a characteristic luminance (which as said before can be any spatial/value equation on the spatial and/or luminance(/color) value distribution of the pixels of the input image which summarizes how (physically or perceptually) light the image is) CHRLUM_i, which in this case shows the image is not very light because of its low position on the Lin axis (probably because there are a lot of dark pixels, and the bright regions are not predominant, neither in quantity nor luminance). This single characteristic luminance hence defines the image which is mostly darkish, although there may be a bright region (in general a more complex characterization may be used, comprising further characteristic luminance values describing the complexity of the current image or shot). Representing this original image in the HDR color space intended for display driving with output luminance Lout (whether via a backlight/transmission decomposition or not, i.e. Lout possibly representing e.g. a fully encoded {0, 65K} image, or alternatively, the histogram of a backlight driving image), therewith corresponds an initial (original, starting) characteristic luminance CHRLUM_ini (e.g. calculated with the same equation as for the input image on the {0, 65K} image resulting from a simple mapping, such as a mere stretch, or a more nonlinear function mapping the darker luminances approximately to a range of a standard, 500 nit representation [i.e. for linear driving—or compensated whatever the gamma—that would for a 2000 nit display correspond to some part of the lowest quarter of the driving values] and the brighter objects map to a higher luminance values of the HDR range). The initial allocation to the HDR range was conceptualized as Lin* (example shown for pixels needing no luminance deviation/boosting). However, we want to give an additional e.g. psychovisual boost to at least the brightest luminances/regions, moving the BRLGHT partial histogram upward on the Lout axis, which corresponds to a higher characteristic luminance CHRLUM_o. Note that although we describe everything conceptually related to the characteristic luminance to define the invention, it can be actually realized in several different ways. Typically the image processing will correspond to such operations like (local) tone mappings (TMO_B), which typically vary with time (at least partly guided by some data retrieved from DD), as can be clearly seen from the second vertical histogram for a later time moment (t2), for which the partial subhistogram BRLGHT has moved down somewhat, corresponding with a lower characteristic luminance CHRLUM_o(t2) [we assumed for simplicity the input picture histogram was the same at t2, otherwise that will also be reflected in the output histogram, since it usually only the tone mapping strategy which changes as a function of time and the additional data as prescribed by the present invention embodiments]. As said before, the same processing concepts according to this invention can also be characterized additionally or similarly by looking e.g. at the local spans of partial histograms SP_I vs. SP_O, etc. (i.e. where one could calculate a characteristic luminance, an alternative representation measuring the same would be equivalent). Any embodiment can be realized in single, streamlined operations, so reprocessing should be interpreted in a generic sense of processing. Note that the time instants TMA_1 etc. can also be encoded in the video at a more denser rate (and/or more equidistant), in which case we would give some of them a no-change code, or at least an ALCORR "not_allowed" code, or similar, since they are nothing particularly special (but this can be useful for having a denser description of some characteristic-luminance-related or similar properties, which is useful for controlling the processing in a temporal vicinity, e.g. for energetic considerations, such as backlight driving). A related conception is encoding changes somewhat before they actually occur.

It should be understood that with the present one may realize many optical effect renderings, e.g. shine-throughs etc. It should also be realized that the present invention can be used in connection with a single video encoding VID (e.g. augmentation of an LDR encoding), but also together with several related encodings (e.g. an LDR and HDR variant), and then e.g. be used to relate them. E.g. the time instants may indicate particularly interesting time segments of similarity or dissimilarity, and the image processing profiles may be such to relate them or make them more or less similar, or derive new renderings on the both of them etc. At least some parts of the additional data may be determined at least in part on the video data, or separate therefrom (although there will normally be some correlation, a human may prescribe some specific formulation). Furthermore the derivation of the additional data such as time instants etc. is preferably done starting from any HDR signal (e.g. an HDR grade), but could also be done—e.g. as a rough estimate—based upon derived video codings.

Having elaborated the present invention with several embodiments, we return to FIG. 1 for further possibilities regarding an arrangement on the video receiving, and typically display side. Several other apparatuses can comprise at least part of the invention components, and contribute to the invention, e.g. a video receiving apparatus 120 with storage may be connected via connection (wireless or cable) 121. This video receiving apparatus 120 may apply its own analysis and annotation according to the invention e.g. offline during the night for a video program downloaded e.g. via a connection 122 to the internet 130, and to be viewed later on, to create a sensible driving strategy for the backlight of the connected display. Note that via the internet computers 131 may be reached which contain annotation data according to the present invention (e.g. from an offline service provider), and the video receiving apparatus 120 may even connect via the internet to feeds from LDR or HDR cameras 132.

Figure 8:
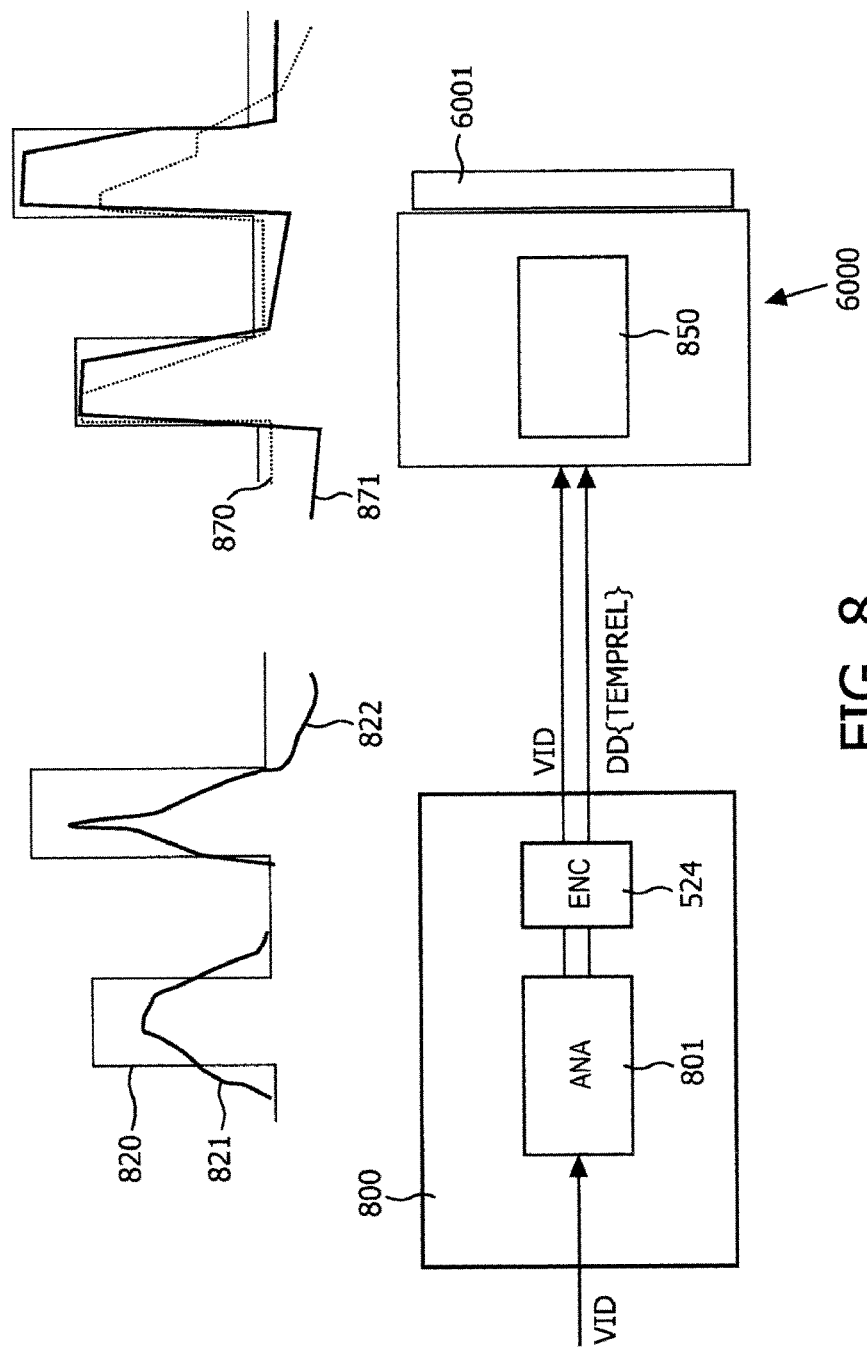
FIG. 8 schematically illustrates an application of the present additional data encoding in a power-optimization scenario/arrangement.

FIG. 8 describes an exemplary arrangement with a first side apparatus (the first side typically still being in the same location as the other apparatuses of the arrangement, e.g. a consumer's house, but possibly operating at a different time), and a second side apparatus (e.g. a tv). In this example, we embodied the first side apparatus as an image processing apparatus 800 with a power function, e.g. it may be a settopbox with storage which may preprocess a movie (of course, the same may happen in the television already, or at a processing side somewhere in the world etc.).

As described e.g. in U.S. Pat. No. 7,284,874B [Jeong, LED backlight including cooling], displays may get hot, and especially if many bright images are shown, backlights may get very hot, in particular if the cooler has to work above its specifications, too hot. However, one can model how the heat from a region of the backlight is convected away.

The image processing apparatus 800 comprises a video analyzer 801, which is arranged to analyze the video in a thermal-performance related way. I.e. it typically has knowledge of a thermal model, and the impact of particular video, such as explosions or bright views on outdoors scenes, on the thermal performance of e.g. a preloaded display characterization (e.g. a thermal model of the backlight of a connected television). We describe a somewhat more simple analysis unit which just send "generic" temporal characterizations which the receiving side may then use within its own thermal modeling, and alternatively an analysis unit which already largely determines optimal display driving behavior for the receiving display. A video signal 820 may contain two explosions. A generic temporal characterization may describe at least one such explosion—or in general a future luminance profile—with a particular modeling function 821. E.g., a linear additive weighing of characteristic luminances of a number of images in the future (or local regions etc.) may be calculated. Generically such weighing may depend (for a reference display) on the duration of an overload, since longer periods are supposed to have a greater chance of overheating. I.e., the weighing of longer lasting explosions may be higher (amplitude is trivially incorporated). The weight coefficients may be received e.g. from the television/second side. Anyway, the television may use such a thermal temporal characterization TEMPREL of the video to more safely determine its own settings. E.g., a television not having the benefit of the currently presented additional data will do its backlight modulation based on the dotted profile 870. It will simply follow the boost, but needs to dim down halfway because it is overheating. Not knowing a second boost is coming, it will for thermal reasons be forced loose even more brightness there (making the second explosion less bright than the first instead of brighter). With the additional data, the display can use a smarter driving strategy, symbolized with the dashed characteristic luminance profile 871. I.e. it may dim down less annoyingly in the dark part before the explosion, and perhaps somewhat in the first explosion, to reserve boost for the second.

Alternatively, the video analyzer 801 may simulate given actual thermal models what the effect of actual (approximate) modifications 822 would be, and prescribe those as modification models, at least for tentative guidance of the display. In any scenario a power-related display driving optimizer 850 will determine the final driving of the display, based on whatever additional data DD it gets. Alternative embodiments may specify as additional data DD e.g. a temporally varying warning signal, or available thermal budget, which specifies how critical (likely) a display is coming to overheating, etc.

Figure 9:
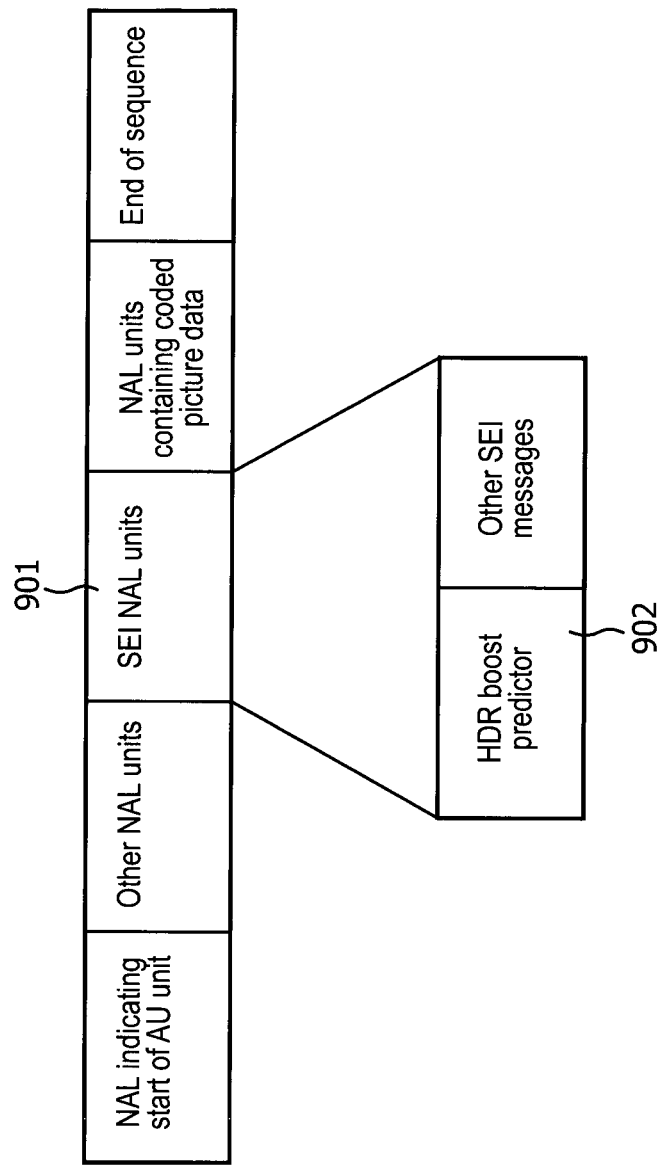
FIG. 9 schematically illustrates an example of an encoding of the additional data in relation to video data.

FIG. 9 gives an exemplary embodiment of encoding the present additional data in conformance with the SEI structure of MPEG4-AVC. We describe the AVC example as an example of broadcasting from a "content creation" side to a content rendering side such as a consumer television, and a CEA 861-D example of an encoding between e.g. two consumer apparatuses such as a BD player and a television, and the control or informing possibilities between them.

MPEG has defined a special metadata container specifically for additional signaling information related to the encoded video. This metadata container is called the Supplemental Enhancement Information message abbreviated to SEI message. The SEI message is carried in separate data blocks together with the video data in a stream (SEI NAL Unit 901).

A h2.64 stream is built up out of NAL units (Network Abstraction Layer). In h2.64 several different types of NAL unit are defined, for example a NAL unit which contains the coded picture data and a NAL unit that contains the SEI messages. Several of these NAL units together form an access unit. In an access unit all the data is available that is required to start decoding and presenting one or more video frames.

The time instants of e.g. exceptionally bright scenes may be described with PTS values (programming time stamps). DTS values may indicate when—sufficiently in time—the SEI message needs to be decoded and send to the sub-units using it.

An exemplary SEI message syntax for carrying a HDR brightness boost specifyer 902 may look as follows

| HDR_Boost_predictor(payloadsize) { | No of bits | type |
|---|---|---|
| Marker_bit(s) | 1 | BSLBF |
| Frame_rate | 8 | UIMSBF |
| PTS_start | 32 | UIMSBF |
| PTS_end | 32 | UIMSBF |
| HDR_DTS | 32 | UIMSBF |
| Region_horizontal_position | 16 | UIMSBF |
| Region_vertical_position | 16 | UIMSBF |
| Region_width | 16 | UIMSBF |
| Region_height | 16 | UIMSBF |
| HDR_Gain | 7 | UIMSBF |
| Reserved for future use | 16 | UIMSBF |
| } | | |

In this message, the codings have the following meaning.
Marker_bit(s): bits to indicate start of SEI message
Frame_rate: the frame rate of the associated video for calculating the PTS values to the System Clock
PTS_start: the PTS value of the first IDR frame that contains the exceptionally bright scenes
PTS_end: the PTS value of the last IDR frame that contains the exceptionally bright scenes
HDR_DTS: Timestamp that indicates when the SEI messages should be decoded.

Region_horizontal_position: The horizontal position of the region of the frames that are exceptionally bright.
Region_vertical_position: The vertical position of the region of the frames that are exceptionally bright
Region_width: The width of the region
Region_height: The height
HDR_Gain: A code defining how bright the current frames are, e.g. in relation to a reference level which displays may handle without overheating.

The following example has the message embedded in the signaling over the video interface between a video content delivering apparatus and display. Currently exemplary standards for this are HDMI and Displayport. Signaling in both standards is based on the CEA 861-D standard. This defines the content of a Vendor specific infoframe, which consists of a number of bytes that can be transmitted during the vertical blanking periods of the video transmission.

An exemplary HDMI vendor specific Data block HDR may look like this.

| | | | Packet Byte # | | | | |
|---|---|---|---|---|---|---|---|
| | 7 | 6 5 | 4 | 3 | 2 | 1 | 0 |
| PB0 | | | Not relevant | | | Length | |
| PB1 | | | 24 bit IEEE registration identifier | | | | |
| PB2 | | | | | | | |
| PB3 | | | | | | | |
| PB4 | | | Not relevant | | | | |
| PB5 | | | | | | | |
| PB6 | | | Not relevant | | | | |
| PB7 | | | | | | | |
| PB8 | | Not relevant | HDMI_HDR_Boost_present | | | | |
| PB9-15 | | | Not relevant | | | | |
| PB16 | | | HDR_Gain | | | | |
| PB17 | | | HDR_Boost_Region_Hor_LSB | | | | |
| PB18 | | | HDR_Boost_Region_Hor_MSB | | | | |
| PB19 | | | HDR_Boost_Region_Ver_LSB | | | | |
| PB20 | | | HDR_Boost_Region_Ver_MSB | | | | |
| PB21 | | | HDR_Boost_region_width_LSB | | | | |
| PB22 | | | HDR_Boost_region_width_MSB | | | | |
| PB23 | | | HDR_Boost_region_height_LSB | | | | |
| PB24 | | | HDR_Boost_region_height_MSB | | | | |
| PB (length) | | | | | | | |

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may be/have been (e.g. in factory, or consumer input) present.

It should be understandable to the skilled person from our presentation which components may be optional improvements and can be realized in combination with other components, and how (optional) steps of methods correspond to respective means of apparatuses, and vice versa. The fact that some components are disclosed in the invention in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the extensive scope of the claims. In fact, the components of the invention can be embodied in different variants along any use chain, e.g. all variants of encoder may be similar as or correspond to corresponding decoders and vice versa, and be encoded as specific signal data in a signal for transmission, or further use such as coordination, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. Such data may be (partially) supplied in any way.

Some of the steps required for the operation of the method may be already present in the functionality of the processor or any apparatus embodiments of the invention instead of described in the computer program product or any unit, apparatus or method described herein (with specifics of the invention embodiments), such as data input and output steps, well-known typically incorporated processing steps such as standard display driving, etc. We also desire protection for resultant products and similar resultants, like e.g. the specific novel signals involved at any step of the methods or in any subpart of the apparatuses, as well as any new uses of such signals, or any related methods.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:
1. A method of encoding, in addition to video data (VID), additional data (DD), the method comprising:
   determining at least one change time instant (TMA_1) indicating a change in a characteristic luminance (CHRLUM) within an image of the video data, the characteristic luminance being derived based on a set of luminances of pixels in the image of the video data, wherein the change is determined from a desired level of the characteristic luminance of a low dynamic range (LDR) representation of the image;

generating, on the basis of the video data (VID) and the at least one change time instant (TMA_1), descriptive data (DED) of the characteristic luminance variation of the video data, and encoding and outputting the video data (VID);

encoding and outputting the descriptive data (DED) as the additional data (DD), wherein the additional data (DD) comprises:

the at least one change time instant (TMA_1); and at least one indication (ALCORR, (TYPE)) of allowed reprocessing strategies, the at least one indication providing instruction to a receiving device regarding processing of the video data, wherein the at least one indication defines a first reprocessing to be performed on pixels of the video data based on the type of video data and a second reprocessing to be performed on pixels associated with the at least one change time instant (TMA_1), wherein the second reprocessing represents a processing for altering characteristics of said pixels associated with the at least one change time instant determined by the first reprocessing of the pixels of the video data, said altering mitigating differences in the characteristics of said pixels associated with the at least one change time instant and said pixels of the video data.

2. The method of encoding as claimed in claim 1 comprising:

encoding a particular reprocessing code (MULT) from a set of prefixed agreed codes.

3. The method of encoding as claimed in claim 1, comprising:

encoding in the additional data (DD) a luminance deviation strategy, encoded as one of: an encoded temporal profile (PROF) and a mathematical algorithm for calculating a deviation strategy, prescribed over successive time instants around the at least one change time instant (TMA_1) for reprocessing during a time interval DTI the pixel luminances of the video data (VID), as compared to initial luminances (Lin*).

4. The method of encoding as claimed in claim 1, wherein the reprocessing is based on a psychovisual model modeling the perceived lightness from rendered pixel luminances.

5. The method of encoding as claimed in claim 1, wherein the reprocessing is based on a physical characteristic of one of: a display environment and a viewing environment.

6. The method of encoding as claimed in claim 1 wherein the reprocessing is of a type comprising:

determining an illumination image for a backlight (ILIM), and the encoding step comprises:

encoding data for influencing the determination of the illumination image for a backlight (ILIM) during an interval around the change time instant (TMA_1), wherein the influencing comprising: a temporal function comprised of elementary basis function contributions for at least a spatial region of positions of a two dimensional matrix (MAP).

7. The method of encoding as claimed in claim 1, comprising:

encoding in the additional data (DD) information of characteristic luminances of a future of the change time instant (TMA_1) and/or information of expected luminances of an illumination image for a backlight (ILIM) of a reference display.

8. The method of encoding as claimed in claim 1, comprising a step of encoding in the additional data (DD) an importance indication (IMPLEV) for the at least one change time instant (TMA_1).

9. The method of encoding claimed in claim 1, wherein the method comprises:

mapping luminances of to be rendered pixels between a lower dynamic luminance range and a higher dynamic luminance range.

10. A video encoding apparatus comprising:

an encoder configured to:

encode video data (VID); and encode additional data (DD) comprising:

at least one change time instant (TMA_1) indicating a change of a characteristic luminance (CHRLUM) within an image of the video data, the characteristic luminance being derived based on a set of luminances of pixels in an image of the video data, wherein the change is determined from a desired level of the characteristic luminance of a low dynamic range (LDR) representation of the image; and a reprocessing strategy comprising:

at least one indication (ALCORR, (TYPE)) of allowed reprocessing strategies, the at least one indication providing instruction to a receiving device regarding processing of the video data, wherein the at least one indication defines a first reprocessing to be performed on pixels of the video data based on the type of video data and a second reprocessing to be performed on pixels associated with the at least one change time instant (TMA_1), wherein the second reprocessing represents a processing for altering characteristics of said pixels associated with the at least one change time instant determined by the first reprocessing of the pixels of the video data, said altering mitigating differences in the characteristics of said pixels associated with the at least one change time instant and said pixels of the video data.

11. A video encoding apparatus comprising:

a processor configured to:

encode video data (VID); and encode descriptive data (DD) comprising:

at least one change time instant (TMA_1) determined based on a change of characteristic luminance (CHRLUM) within an image of the video data, the characteristic luminance being derived based on a set of luminance of pixels in an image of the video data, wherein the change is determined from a desired level of the characteristic luminance of a low dynamic range (LDR) representation of the image; and a reprocessing strategy indication of at least allowed reprocessing strategies, the indication providing instruction to a receiving device regarding performing processing of the video data, wherein the at least one indication defines a first reprocessing to be performed on pixels of the video data based on the type of video data and a second reprocessing to be performed on pixels associated with the at least one change time instant (TMA_1), wherein the second reprocessing represents a processing for altering characteristics of said pixels associated with the at least one change time instant determined by the first reprocessing of the pixels of the video data, said altering mitigating differences in the characteristics of said pixels associated with the at least one change time instant and said pixels of the video data.

12. The video encoding apparatus of claim 11, wherein the reprocessing is based on a psychovisual model modeling the perceived lightness from rendered pixel luminances.

13. The video encoding apparatus of claim 11, wherein the reprocessing is based on a physical characteristic of one of: a display environment and a viewing environment.

14. The video encoding apparatus of claim 11 wherein the reprocessing is of a type comprising:
  determining an illumination image for a backlight (ILIM), and the encoding comprises:
  encoding data to influence the determination of the illumination image for a backlight (ILIM) during an interval around the change time instant (TMA_1), wherein said influencing comprising: a temporal function comprised of elementary basis function contributions for at least a spatial region of positions of a two dimensional matrix (MAP).

15. The video encoding apparatus of claim 11, wherein:
  the processor encodes in the descriptive data (DD) information of characteristic luminances of a future of the change time instant (TMA_1) and/or information of expected luminances of an illumination image for a backlight (ILIM) of a reference display.

16. The video encoding apparatus of claim 11, wherein the processor is configured to encode in the descriptive data (DD) an importance indication (IMPLEV) for the at least one change time instant (TMA_1).

17. The video encoding apparatus of claim 11, wherein the video encoding apparatus:
  maps luminances of to be rendered pixels between a lower dynamic luminance range and a higher dynamic luminance range.

18. The video encoding apparatus of claim 11 wherein:
  the processor is configured to encode a particular reprocessing code (MULT) from a set of prefixed agreed codes.

19. The video encoding apparatus of claim 11, wherein:
  the processor encodes in the additional data (DD) a luminance deviation strategy, encoded as one of: an encoded temporal profile (PROF) and a mathematical algorithm for calculating a deviation strategy, prescribed over successive time instants around the at least one change time instant (TMA_1) for reprocessing during a time interval DTI the pixel luminances of the video data (VID), as compared to initial luminances (Lin*).

20. A method of decoding a video stream comprising video data (VID) and additional data (DD) comprising:
  extracting from the additional data at least one change time instant (TMA_1) indicating a change of a characteristic luminance (CHRLUM) within an image of the video data, the characteristic luminance being derived based on a set of luminances of pixels in an image of the video data, wherein the change is determined from a desired level of the characteristic luminance of a low dynamic range (LDR) representation of the image; and
  at least one indication (ALCORR, (TYPE)) of allowed reprocessing strategies, the at least one indication providing instruction regarding processing of the video data, wherein the at least one indication defines a first reprocessing to be performed on pixels of the video data based on the type of video data and a second reprocessing to be performed on pixels associated with the at least one change time instant (TMA_1), wherein the second reprocessing represents a processing for altering characteristics of said pixels associated with the at least one change time instant determined by the first reprocessing of the pixels of the video data, said altering mitigating differences in the characteristics of said pixels associated with the at least one change time instant and said pixels of the video data; and
  outputting the at least one indication in a pre-agreed format.

21. The method of decoding as claimed in claim 20, further comprising:
  decoding and outputting any at least one encoded data entity.

22. An apparatus for generating a data signal (NDAT) associated with video data (VID), the apparatus comprising:
  a processor configured to:
    generate a data signal comprising:
      at least one change time instant (TMA_1) indicating a change of a characteristic luminance (CHRLUM) within an image of the video data, wherein the characteristic luminance being derived based on a set of luminances of pixels in an image of the video data wherein the change is determined from a desired level of the characteristic luminance of a low dynamic range (LDR) representation of the image; and
      at least one indication, providing instruction regarding processing of the video data, wherein the at least one indication defines a first reprocessing to be performed on pixels of the video data based on the type of video data and a second reprocessing to be performed on pixels associated with the at least one change time instant (TMA_1), wherein the second reprocessing represents a processing for altering characteristics of said pixels associated with the at least one change time instant determined by the first reprocessing of the pixels of the video data, said altering mitigating differences in the characteristics of said pixels associated with the at least one change time instant and said pixels of the video data.

23. A video decoding apparatus configured to decode video data (VID) and additional data, related to the video data (VID), the apparatus comprising:
  a decoder configured to:
    decode from the additional data (DD):
      at least one change time instant (TMA_1) indicating a change of a characteristic luminance (CHRLUM) within an image of the video data, the characteristic luminance being derived based on a set of luminances of pixels in an image of the video data, wherein the change is determined from a desired level of the characteristic luminance of a low dynamic range (LDR) representation of the image;
    classify at least one pixel associated with a corresponding one of the change time instant (TMA_1) as selected pixels; and
    at least one indication (ALCORR, (TYPE)) of allowed reprocessing strategies, the at least one indication providing instruction to the decoder, regarding processing of the video data, wherein the at least one indication defines a first reprocessing to be performed on pixels of the video data based on the type of video data and a second reprocessing to be performed on pixels associated with the at least one change time instant (TMA_1), wherein the second reprocessing represents a processing for altering characteristics of said pixels associated with the at least one change time instant determined by the first reprocessing of the pixels of the video data, said altering mitigating differences in the characteristics of said pixels associated with the at least one change time instant and said pixels of the video data; and output, via an output, at least the at least one change time instant.

24. The video decoding apparatus as claimed in claim 23, further configured to:
decode a particular reprocessing code (MULT) from a set of prefixed agreed codes.

25. The video decoding apparatus as claimed in claim 23, further configured to:
decode a luminance deviation strategy, the deviation strategy comprising one of: an encoded temporal profile (PROF) and a mathematical algorithm for calculating a deviation strategy, prescribed over successive time instants around the at least one change time instant (TMA_1), for reprocessing during a time interval DTI the pixel luminances of the video data (VID), as compared to initial luminances (Lin*).

26. The video decoding apparatus as claimed in claim 23, further configured to:
decode at least one specification for determining a driving image for a backlight (ILIM).

27. The video decoding apparatus as claimed in claim 23, further configured to:
decode at least one specification (SPECFUT) of one of: summarizing characteristic luminances of a future of the change time instant (TMA_1) and information of expected luminances of an illumination image for a backlight (ILIM) of a reference display.

28. An arrangement for decoding video data comprising:
a video decoding apparatus comprising:
a decoder configured to:
decode from additional data (DD):
at least one change time instant (TMA_1) indicating a change of a characteristic luminance (CHRLUM) within an image of the video data, the characteristic luminance being derived based on a set of luminances of pixels in an image of the video data, wherein the change is determined from a desired level of the characteristic luminance of a low dynamic range (LDR) representation of the image;
classify at least one pixel associated with a corresponding one of the change time instant (TMA_1) as selected pixels; and
at least one indication (ALCORR, (TYPE)) of allowed reprocessing strategies, the at least one indication providing instruction to the decoder regarding processing of the video data, wherein the at least one indication defines a first reprocessing to be performed on the characteristic luminance of pixels of the video data based on the type of video data and a second reprocessing to be performed on pixels associated with the at least one change time instant (TMA_1), wherein the second reprocessing represents a processing for altering characteristics luminance of said pixels associated with the at least one change time instant determined by the first reprocessing of the pixels of the video data, said altering mitigating differences in the characteristics of said pixels associated with the at least one change time instant and said pixels of the video data; and a display configured to:
change its rendering of the video image at the at least one change time instant (TMA_1) based on the reprocessing strategy about the at least one change time instant.

29. A computer readable medium that is not a transitory propagating wave or signal, comprising-:
video data and additional data (DD), the additional data comprising:
at least one change time instant (TMA_1) indicating a change a characteristic luminance (CHRLUM) within an image of associated video data, wherein the characteristic luminance being derived based on a set of luminances of pixels in an image of the video data, wherein the change is determined from a desired level of the characteristic luminance of a low dynamic range (LDR) representation of the image, and
at least one indication (ALCORR, (TYPE)) of allowed reprocessing strategies, the at least one indication providing instruction to a receiving device regarding processing of the video data, wherein the at least one indication defines a first reprocessing to be performed on the characteristic luminance of pixels of the video data based on the type of video data and a second reprocessing to be performed on pixels associated with the at least one change time instant (TMA_1), wherein the second reprocessing represents a processing for altering characteristics luminance of said pixels associated with the at least one change time instant determined by the first reprocessing of the pixels of the video data, said altering mitigating differences in the characteristics of said pixels associated with the at least one change time instant and said pixels of the video data, wherein the additional data is one of: interleaved with the video data (VID) or in separate locations on the computer readable medium.

* * * * *